United States Patent
Garrison et al.

(10) Patent No.: US 9,747,556 B2
(45) Date of Patent: Aug. 29, 2017

(54) AUTOMATED CUSTOMIZED WEB PORTAL TEMPLATE GENERATION SYSTEMS AND METHODS

(71) Applicant: Vertafore, Inc., Bothell, WA (US)

(72) Inventors: Sara Garrison, Woodinville, WA (US); Aleksey Sinyagin, Redmond, WA (US)

(73) Assignee: Vertafore, Inc., Bothell, WA (US)

( * ) Notice: Subject to any disclaimer, the term of this patent is extended or adjusted under 35 U.S.C. 154(b) by 417 days.

(21) Appl. No.: 14/464,576

(22) Filed: Aug. 20, 2014

(65) Prior Publication Data

US 2016/0055132 A1  Feb. 25, 2016

(51) Int. Cl.
| | |
|---|---|
| G06N 99/00 | (2010.01) |
| G06F 17/24 | (2006.01) |
| G06F 17/22 | (2006.01) |
| G06F 17/27 | (2006.01) |
| G06F 17/30 | (2006.01) |

(52) U.S. Cl.
CPC ....... *G06N 99/005* (2013.01); *G06F 17/2247* (2013.01); *G06F 17/248* (2013.01); *G06F 17/272* (2013.01); *G06F 17/3089* (2013.01)

(58) Field of Classification Search
CPC . G06N 99/005; G06F 17/2247; G06F 17/248; G06F 17/272; G06F 17/3089; G06F 17/218
USPC .......................................................... 706/12
See application file for complete search history.

(56) References Cited

U.S. PATENT DOCUMENTS

| | | | |
|---|---|---|---|
| 3,970,992 A | 7/1976 | Boothroyd et al. | |
| 4,346,442 A | 8/1982 | Musmanno | |
| 4,347,568 A | 8/1982 | Giguere et al. | |
| 4,359,631 A | 11/1982 | Lockwood et al. | |
| 4,383,298 A | 5/1983 | Huff et al. | |
| 4,410,940 A | 10/1983 | Carlson et al. | |

(Continued)

FOREIGN PATENT DOCUMENTS

| | | |
|---|---|---|
| CA | 2646167 A1 | 10/2007 |
| CA | 2649441 A1 | 10/2007 |

(Continued)

OTHER PUBLICATIONS

"AMS Real-Time Getting Started Guide," AMS Services, Vertafore, Inc., 9 pages, 2008.

(Continued)

*Primary Examiner* — Dave Misir
(74) *Attorney, Agent, or Firm* — Seed Intellectual Property Law Group LLP

(57) ABSTRACT

An automated Web portal template generation method includes parsing, via a parser subsystem, a number of Webpages of a first Website from which a Web portal template to be customized is to be accessed. The method further includes producing an entity feature set for the first Website based on a result of the parsing and processing the entity feature set for the first Website via a classifier subsystem to produce a set of data that represents, for each of a plurality of entities, a respective probability of the entity belonging to a respective one of a plurality of classes. The method additionally includes performing, by a color matching subsystem, color matching on the set of data produced by the classifier subsystem to generate a number of proposed color combinations for a proposed customization of the Web portal template.

20 Claims, 9 Drawing Sheets

(56) References Cited

U.S. PATENT DOCUMENTS

| | | |
|---|---|---|
| 4,429,360 A | 1/1984 | Hoffman et al. |
| 4,486,831 A | 12/1984 | Wheatley et al. |
| 4,491,725 A | 1/1985 | Pritchard |
| 4,503,499 A | 3/1985 | Mason et al. |
| 4,553,206 A | 11/1985 | Smutek et al. |
| 4,567,359 A | 1/1986 | Lockwood |
| 4,591,974 A | 5/1986 | Dornbush et al. |
| 4,598,367 A | 7/1986 | DeFrancesco et al. |
| 4,633,430 A | 12/1986 | Cooper |
| 4,642,768 A | 2/1987 | Roberts |
| 4,646,229 A | 2/1987 | Boyle |
| 4,646,231 A | 2/1987 | Green et al. |
| 4,646,250 A | 2/1987 | Childress |
| 4,648,037 A | 3/1987 | Valentino |
| 4,658,351 A | 4/1987 | Teng |
| 4,730,252 A | 3/1988 | Bradshaw |
| 4,794,515 A | 12/1988 | Hornung |
| 4,809,170 A | 2/1989 | Leblang et al. |
| 4,819,156 A | 4/1989 | DeLorme et al. |
| 4,831,526 A | 5/1989 | Luchs et al. |
| 4,845,644 A | 7/1989 | Anthias et al. |
| 4,860,247 A | 8/1989 | Uchida et al. |
| 4,912,628 A | 3/1990 | Briggs |
| 4,918,588 A | 4/1990 | Barrett et al. |
| 4,928,243 A | 5/1990 | Hodges et al. |
| 4,928,252 A | 5/1990 | Gabbe et al. |
| 4,949,251 A | 8/1990 | Griffin et al. |
| 4,951,194 A | 8/1990 | Bradley et al. |
| 4,959,769 A | 9/1990 | Cooper et al. |
| 4,985,831 A | 1/1991 | Dulong et al. |
| 5,072,412 A | 12/1991 | Henderson, Jr. et al. |
| 5,086,502 A | 2/1992 | Malcolm |
| 5,159,669 A | 10/1992 | Trigg et al. |
| 5,161,226 A | 11/1992 | Wainer |
| 5,170,480 A | 12/1992 | Mohan et al. |
| 5,175,853 A | 12/1992 | Kardach et al. |
| 5,201,033 A | 4/1993 | Eagen et al. |
| 5,220,665 A | 6/1993 | Coyle, Jr. et al. |
| 5,241,677 A | 8/1993 | Naganuma et al. |
| 5,257,375 A | 10/1993 | Clark et al. |
| 5,261,099 A | 11/1993 | Bigo et al. |
| 5,263,134 A | 11/1993 | Paal et al. |
| 5,265,159 A | 11/1993 | Kung |
| 5,282,052 A | 1/1994 | Johnson et al. |
| 5,317,733 A | 5/1994 | Murdock |
| 5,363,214 A | 11/1994 | Johnson |
| 5,448,729 A | 9/1995 | Murdock |
| 5,517,644 A | 5/1996 | Murdock |
| 5,530,861 A | 6/1996 | Diamant et al. |
| 5,537,315 A | 7/1996 | Mitcham |
| 5,553,282 A | 9/1996 | Parrish et al. |
| 5,583,922 A | 12/1996 | Davis et al. |
| 5,634,052 A | 5/1997 | Morris |
| 5,812,859 A | 9/1998 | Kamimaki et al. |
| 5,864,340 A | 1/1999 | Bertram et al. |
| 5,880,724 A | 3/1999 | Bertram et al. |
| 5,968,125 A | 10/1999 | Garrick et al. |
| 6,044,475 A | 3/2000 | Chung et al. |
| 6,049,877 A | 4/2000 | White |
| 6,065,026 A | 5/2000 | Cornelia et al. |
| 6,128,653 A | 10/2000 | del Val et al. |
| 6,199,079 B1 | 3/2001 | Gupta et al. |
| 6,240,416 B1 | 5/2001 | Immon et al. |
| 6,247,020 B1 | 6/2001 | Minard |
| 6,271,846 B1 | 8/2001 | Martinez et al. |
| 6,272,678 B1 | 8/2001 | Imachi et al. |
| 6,301,592 B1 | 10/2001 | Aoyama et al. |
| 6,362,836 B1 | 3/2002 | Shaw et al. |
| 6,366,920 B1 | 4/2002 | Hoose et al. |
| 6,377,948 B2 | 4/2002 | Kikuchi et al. |
| 6,381,744 B2 | 4/2002 | Nanos et al. |
| 6,385,642 B1 | 5/2002 | Chlan et al. |
| 6,393,407 B1 | 5/2002 | Middleton, III et al. |
| 6,393,438 B1 | 5/2002 | Kathrow et al. |
| 6,405,238 B1 | 6/2002 | Votipka |
| 6,407,752 B1 | 6/2002 | Harnett |
| 6,430,575 B1 | 8/2002 | Dourish et al. |
| 6,437,803 B1 | 8/2002 | Panasyuk et al. |
| 6,463,343 B1 | 10/2002 | Emens et al. |
| 6,490,601 B1 | 12/2002 | Markus et al. |
| 6,510,430 B1 | 1/2003 | Oberwager et al. |
| 6,538,667 B1 | 3/2003 | Duursma et al. |
| 6,546,405 B2 | 4/2003 | Gupta et al. |
| 6,553,419 B1 | 4/2003 | Ram |
| 6,592,629 B1 | 7/2003 | Cullen et al. |
| 6,601,047 B2 | 7/2003 | Wang et al. |
| 6,658,167 B1 | 12/2003 | Lee et al. |
| 6,658,659 B2 | 12/2003 | Hiller et al. |
| 6,671,716 B1 | 12/2003 | Diedrichsen et al. |
| 6,766,471 B2 | 7/2004 | Meth |
| 6,795,966 B1 | 9/2004 | Lim et al. |
| 6,915,435 B1 | 7/2005 | Merriam |
| 6,918,082 B1 | 7/2005 | Gross et al. |
| 6,978,376 B2 | 12/2005 | Giroux et al. |
| 6,993,529 B1 | 1/2006 | Basko et al. |
| 6,993,661 B1 | 1/2006 | Garfinkel |
| 7,000,230 B1 | 2/2006 | Murray et al. |
| 7,010,503 B1 | 3/2006 | Oliver et al. |
| 7,020,779 B1 | 3/2006 | Sutherland |
| 7,028,223 B1 | 4/2006 | Kolawa et al. |
| 7,146,495 B2 | 12/2006 | Baldwin et al. |
| 7,178,110 B2 | 2/2007 | Fujino |
| 7,191,195 B2 | 3/2007 | Koyama et al. |
| 7,206,998 B2 | 4/2007 | Pennell et al. |
| 7,266,537 B2 | 9/2007 | Jacobsen et al. |
| 7,296,193 B2 | 11/2007 | Goode et al. |
| 7,299,202 B2 | 11/2007 | Swanson |
| 7,299,502 B2 | 11/2007 | Schmeling et al. |
| 7,318,193 B2 | 1/2008 | Kim et al. |
| 7,321,539 B2 | 1/2008 | Ballantyne |
| 7,322,025 B2 | 1/2008 | Reddy et al. |
| 7,372,789 B2 | 5/2008 | Kuroda |
| 7,421,438 B2 | 9/2008 | Turski et al. |
| 7,440,967 B2 | 10/2008 | Chidlovskii |
| 7,457,878 B1 | 11/2008 | Mathiske et al. |
| 7,478,064 B1 | 1/2009 | Nacht |
| 7,574,048 B2 | 8/2009 | Shilman et al. |
| 7,584,196 B2 | 9/2009 | Reimer et al. |
| 7,587,327 B2 | 9/2009 | Jacobs et al. |
| 7,593,532 B2 | 9/2009 | Plotkin et al. |
| 7,624,189 B2 | 11/2009 | Bucher |
| 7,636,898 B2 | 12/2009 | Takahashi |
| 7,650,320 B2 | 1/2010 | Nakano |
| 7,676,792 B2 | 3/2010 | Irie et al. |
| 7,698,230 B1 | 4/2010 | Brown et al. |
| 7,711,703 B2 | 5/2010 | Smolen et al. |
| 7,725,456 B2 | 5/2010 | Augustine |
| 7,757,168 B1 | 7/2010 | Shanahan et al. |
| 7,757,239 B2 | 7/2010 | Beck |
| 7,814,078 B1 | 10/2010 | Forman et al. |
| 7,836,291 B2 | 11/2010 | Yim et al. |
| 7,886,046 B1 | 2/2011 | Zeitoun et al. |
| 7,930,757 B2 | 4/2011 | Shapiro et al. |
| 7,949,711 B2 | 5/2011 | Chang et al. |
| 7,996,759 B2 | 8/2011 | Elkady |
| 7,996,870 B2 | 8/2011 | Suzuki |
| 8,112,394 B2 | 2/2012 | Shringi et al. |
| 8,140,589 B2 | 3/2012 | Petri |
| 8,146,058 B2 | 3/2012 | Sarkar et al. |
| 8,166,388 B2 | 4/2012 | Gounares et al. |
| 8,171,404 B2 | 5/2012 | Borchers et al. |
| 8,234,219 B2 | 7/2012 | Gorczowski et al. |
| 8,266,592 B2 | 9/2012 | Beto et al. |
| 8,285,685 B2 | 10/2012 | Prahlad et al. |
| 8,290,971 B2 | 10/2012 | Klawitter et al. |
| 8,321,483 B2 | 11/2012 | Serlet et al. |
| 8,370,403 B2 | 2/2013 | Matsuki |
| 8,375,126 B2 | 2/2013 | Kriewall |
| 8,386,407 B2 | 2/2013 | Meliksetian et al. |
| 8,438,045 B2 | 5/2013 | Erlanger |
| 8,458,582 B2 | 6/2013 | Rogers et al. |
| 8,489,921 B2 | 7/2013 | Varadarajan et al. |
| 8,650,043 B1 | 2/2014 | Phillips |
| 8,667,267 B1 | 3/2014 | Garcia et al. |

(56) References Cited

U.S. PATENT DOCUMENTS

| | | |
|---|---|---|
| 8,701,090 B2 | 4/2014 | Zavatone |
| 8,725,682 B2 | 5/2014 | Young et al. |
| 8,825,626 B1 | 9/2014 | Wallace et al. |
| 8,832,045 B2 | 9/2014 | Dodd et al. |
| 2001/0027420 A1 | 10/2001 | Boublik et al. |
| 2001/0032092 A1 | 10/2001 | Calver |
| 2002/0065879 A1 | 5/2002 | Ambrose et al. |
| 2002/0087602 A1 | 7/2002 | Masuda et al. |
| 2002/0120474 A1 | 8/2002 | Hele et al. |
| 2002/0120776 A1 | 8/2002 | Eggebraaten et al. |
| 2002/0138476 A1 | 9/2002 | Suwa et al. |
| 2002/0194033 A1 | 12/2002 | Huff |
| 2002/0194578 A1 | 12/2002 | Irie et al. |
| 2002/0198743 A1 | 12/2002 | Ariathurai et al. |
| 2003/0105813 A1 | 6/2003 | Mizutani |
| 2003/0144887 A1 | 7/2003 | Debber |
| 2003/0191938 A1 | 10/2003 | Woods et al. |
| 2003/0212610 A1 | 11/2003 | Duffy et al. |
| 2004/0039757 A1 | 2/2004 | McClure |
| 2004/0059592 A1 | 3/2004 | Yadav-Ranjan |
| 2004/0059740 A1 | 3/2004 | Hanakawa et al. |
| 2004/0128182 A1 | 7/2004 | Pepoon et al. |
| 2004/0133606 A1 | 7/2004 | Miloushev et al. |
| 2004/0186750 A1 | 9/2004 | Surbey et al. |
| 2004/0193455 A1 | 9/2004 | Kellington |
| 2004/0194026 A1 | 9/2004 | Barrus et al. |
| 2004/0220975 A1 | 11/2004 | Carpentier et al. |
| 2004/0230903 A1 | 11/2004 | Elza et al. |
| 2004/0236614 A1 | 11/2004 | Keith |
| 2004/0243969 A1 | 12/2004 | Kamery et al. |
| 2004/0255275 A1 | 12/2004 | Czerwonka |
| 2004/0267578 A1 | 12/2004 | Pearson |
| 2005/0024387 A1 | 2/2005 | Ratnakar et al. |
| 2005/0033988 A1 | 2/2005 | Chandrashekhar et al. |
| 2005/0071203 A1 | 3/2005 | Maus |
| 2005/0080804 A1 | 4/2005 | Bradshaw, Jr. et al. |
| 2005/0137928 A1 | 6/2005 | Scholl et al. |
| 2005/0144195 A1 | 6/2005 | Hesselink et al. |
| 2005/0233287 A1 | 10/2005 | Bulatov et al. |
| 2005/0278297 A1* | 12/2005 | Nelson ............. G06F 17/30867 |
| 2006/0047540 A1 | 3/2006 | Hutten et al. |
| 2006/0059338 A1 | 3/2006 | Feinleib et al. |
| 2006/0100912 A1 | 5/2006 | Kumar et al. |
| 2006/0184452 A1 | 8/2006 | Barnes et al. |
| 2006/0195491 A1 | 8/2006 | Nieland et al. |
| 2006/0195494 A1 | 8/2006 | Dietrich |
| 2006/0259524 A1 | 11/2006 | Horton |
| 2007/0006222 A1 | 1/2007 | Maier et al. |
| 2007/0016465 A1 | 1/2007 | Schaad |
| 2007/0016829 A1 | 1/2007 | Subramanian et al. |
| 2007/0061154 A1 | 3/2007 | Markvoort et al. |
| 2007/0067772 A1 | 3/2007 | Bustamante |
| 2007/0130346 A1 | 6/2007 | Xie et al. |
| 2007/0160070 A1 | 7/2007 | Buchhop et al. |
| 2007/0186066 A1 | 8/2007 | Desai et al. |
| 2007/0186214 A1 | 8/2007 | Morgan |
| 2007/0233880 A1 | 10/2007 | Nieh et al. |
| 2007/0244921 A1 | 10/2007 | Blair |
| 2007/0244935 A1 | 10/2007 | Cherkasov |
| 2007/0245230 A1 | 10/2007 | Cherkasov |
| 2007/0282927 A1 | 12/2007 | Polouetkov |
| 2008/0002830 A1 | 1/2008 | Cherkasov et al. |
| 2008/0010542 A1 | 1/2008 | Yamamoto et al. |
| 2008/0040690 A1 | 2/2008 | Sakai |
| 2008/0086499 A1 | 4/2008 | Wefers et al. |
| 2008/0091846 A1 | 4/2008 | Dang |
| 2008/0120602 A1 | 5/2008 | Comstock et al. |
| 2008/0281827 A1* | 11/2008 | Wang .................. G06F 17/278 |
| 2009/0007077 A1 | 1/2009 | Musuvathi et al. |
| 2009/0055242 A1 | 2/2009 | Rewari et al. |
| 2009/0119133 A1 | 5/2009 | Yeransian et al. |
| 2009/0199160 A1 | 8/2009 | Vaitheeswaran et al. |
| 2009/0271779 A1 | 10/2009 | Clark |
| 2009/0282457 A1 | 11/2009 | Govindavajhala |
| 2009/0287746 A1 | 11/2009 | Brown |
| 2009/0328171 A1 | 12/2009 | Bayus et al. |
| 2010/0060926 A1 | 3/2010 | Smith et al. |
| 2010/0064230 A1 | 3/2010 | Klawitter et al. |
| 2010/0064258 A1 | 3/2010 | Gorczowski et al. |
| 2010/0091317 A1 | 4/2010 | Williams et al. |
| 2010/0161616 A1 | 6/2010 | Mitchell |
| 2010/0179883 A1 | 7/2010 | Devolites |
| 2010/0199263 A1 | 8/2010 | Clee et al. |
| 2010/0235392 A1 | 9/2010 | McCreight et al. |
| 2011/0021250 A1 | 1/2011 | Ickman et al. |
| 2011/0088014 A1 | 4/2011 | Becker et al. |
| 2011/0145037 A1 | 6/2011 | Domashchenko et al. |
| 2011/0153560 A1 | 6/2011 | Bryant et al. |
| 2011/0161375 A1 | 6/2011 | Tedder et al. |
| 2011/0173153 A1 | 7/2011 | Domashchenko et al. |
| 2011/0184689 A1 | 7/2011 | Awedikian et al. |
| 2011/0184766 A1 | 7/2011 | Virdhagriswaran |
| 2011/0270975 A1 | 11/2011 | Troup |
| 2011/0276875 A1 | 11/2011 | McCabe et al. |
| 2011/0283177 A1 | 11/2011 | Gates et al. |
| 2012/0150919 A1 | 6/2012 | Brown et al. |
| 2012/0159647 A1 | 6/2012 | Sanin et al. |
| 2012/0222014 A1 | 8/2012 | Peretz et al. |
| 2012/0232934 A1 | 9/2012 | Zhang et al. |
| 2012/0269425 A1* | 10/2012 | Marchesotti ........... G06K 9/036 382/159 |
| 2012/0271657 A1 | 10/2012 | Anderson et al. |
| 2013/0024418 A1 | 1/2013 | Sitrick et al. |
| 2013/0054480 A1 | 2/2013 | Ross et al. |
| 2013/0066901 A1 | 3/2013 | Marcelais et al. |
| 2013/0073942 A1 | 3/2013 | Cherkasov |
| 2013/0080760 A1 | 3/2013 | Li et al. |
| 2013/0108152 A1* | 5/2013 | Deng .................... G06T 7/0002 382/159 |
| 2013/0138555 A1 | 5/2013 | Shishkov |
| 2013/0152047 A1 | 6/2013 | Moorthi et al. |
| 2013/0174015 A1* | 7/2013 | Jeff L. .............. G06F 17/30905 715/234 |
| 2013/0212692 A1 | 8/2013 | Sher-Jan et al. |
| 2013/0239217 A1 | 9/2013 | Kindler et al. |
| 2013/0282406 A1 | 10/2013 | Snyder et al. |
| 2013/0282407 A1 | 10/2013 | Snyder et al. |
| 2013/0282408 A1 | 10/2013 | Snyder et al. |
| 2013/0290786 A1 | 10/2013 | Artzi et al. |
| 2013/0298256 A1 | 11/2013 | Barnes et al. |
| 2014/0033307 A1* | 1/2014 | Schmidtler ......... H04L 63/1483 726/22 |
| 2014/0040867 A1 | 2/2014 | Wefers et al. |
| 2014/0046980 A1* | 2/2014 | Kleinschmidt ... G06F 17/30896 707/793 |
| 2014/0075500 A1 | 3/2014 | B'Far et al. |
| 2014/0089786 A1* | 3/2014 | Hashmi ............... G06F 17/2247 715/234 |
| 2014/0096262 A1 | 4/2014 | Casso |
| 2014/0181632 A1* | 6/2014 | Mykins ............. G06F 17/30899 715/234 |
| 2014/0282977 A1 | 9/2014 | Madhu et al. |
| 2014/0283098 A1 | 9/2014 | Phegade et al. |
| 2014/0337973 A1 | 11/2014 | Foster et al. |
| 2014/0358938 A1 | 12/2014 | Billmaier et al. |
| 2015/0100552 A1 | 4/2015 | Malis et al. |
| 2015/0161538 A1 | 6/2015 | Matus et al. |
| 2015/0161620 A1 | 6/2015 | Christner |
| 2015/0215332 A1 | 7/2015 | Curcic et al. |
| 2016/0103853 A1 | 4/2016 | Kritt et al. |
| 2016/0104132 A1 | 4/2016 | Abbatiello et al. |

FOREIGN PATENT DOCUMENTS

| | | |
|---|---|---|
| CA | 2761405 A1 | 6/2012 |
| CA | 2733857 A1 | 9/2012 |
| CA | 2737734 A1 | 10/2012 |
| EP | 0585192 A1 | 3/1994 |
| JP | 60-41138 A | 3/1985 |
| JP | 3-282941 A | 12/1991 |
| JP | 4-373026 A | 12/1992 |
| JP | 11-143567 A | 5/1999 |
| JP | 11-296452 A | 10/1999 |

(56) References Cited

FOREIGN PATENT DOCUMENTS

| | | |
|---|---|---|
| WO | 01/95093 A2 | 12/2001 |
| WO | 2004/088543 A1 | 10/2004 |
| WO | 2007/120771 A2 | 10/2007 |
| WO | 2007/120772 A2 | 10/2007 |
| WO | 2007/120773 A2 | 10/2007 |
| WO | 2007/120774 A2 | 10/2007 |
| WO | 2008/049871 A1 | 5/2008 |
| WO | 2010/030675 A1 | 3/2010 |
| WO | 2010/030676 A1 | 3/2010 |
| WO | 2010/030677 A1 | 3/2010 |
| WO | 2010/030678 A1 | 3/2010 |
| WO | 2010/030679 A1 | 3/2010 |
| WO | 2010/030680 A1 | 3/2010 |
| WO | 2013/072764 A2 | 5/2013 |

OTHER PUBLICATIONS

"VERITAS Replication Exec version 3.1 for Windows," Administrator's Guide, pp. i-20, 49-68, and 119-160, Dec. 2004, 100 pages.
"Update insurance template according to changes in policy," retrieved from https://www.google.com/?tbm=pts, on Sep. 24, 2012, 2 pages.
"Adobe Introduces Adobe Acrobat 3.0 Software," *PR Newswire*, Jun. 3, 1996, 3 pages.
"CoreData Inc. Announces Technology and Marketing Agreement with MobileStar Network Corp.," *Business Wire*, Aug. 26, 1998, 2 pages.
"CoreData Offers E-mail Connectivity for RemoteWorx," *Newsbytes News Network*, Sep. 18, 1998, 1 page.
"Free Sticky Notes software—Sticky Notes program MoRUN.net Sticker Lite," Jan. 11, 2006, retrieved from http://web.archive.org/web/20060112031435/http://www.sticky-notes.net/free/stickynotes.html, on Oct. 10, 2013, 2 pages.
"Internet lifts servers to 64 bits," *Electronic Engineering Times*, Dec. 23, 1996, 3 pages.
"NotesPlusPlus," Feb. 25, 2006, retrieved from http://web.archive.org/web/20060225020405/http://www.sharewareconnection.com/notesplusplus.htm, on Oct. 10, 2013, 2 pages.
"SPSS Unveils Aggressive Development Plans: 1999 Product Releases Will Focus on Scalability and Deployment Solutions for the Enterprise," *Business Wire*, Feb. 18, 1999, 3 pages.
"Windows XP: The Complete Reference: Using Files and Folders," Apr. 28, 2004, retrieved from http://web.archive.org/web/20040428222156/http://delltech.150m.com/XP/files/7.htm, on Oct. 10, 2013, 4 pages.
Alvarez, "Bit Level Comparator Systems and Methods," U.S. Appl. No. 14/101,905, filed Dec. 10, 2013, 57 pages.
Announcement, "Coming Attraction, AMS Invites you to a Special Sneak Preview," AMS Services, 1 page, Aug. 1, 2008.
Brochure, "AMS 360—Business Growth. Productivity. Proven Technology.," Vertafore, Inc., 8 pages, 2008.
Brown et al., "Agency Management System and Content Management System Integration," U.S. Appl. No. 61/422,090, filed Dec. 10, 2010, 54 pages.
Corriveau et al., "AMS Portal Server: Bridging the Gap Between Web Presentation and the Back Office," White Paper, AMS Services, 13 pages, 2008.
Extended European Search Report, dated Jul. 9, 2012, for Application No. 07755347.7, 8 pages.
Extended European Search Report, dated Jun. 14, 2012, for Application No. 07755348.5, 8 pages.
Extended European Search Report, dated Jun. 19, 2012, for Application No. 07755349.3, 8 pages.
Extended European Search Report, dated Jun. 14, 2012, for Application No. 07755350.1, 9 pages.
Fogel, "Open Source Development With CVS," Copyright 1999, 2000, retrieved from http://web.archive.org/web/20000815211634/http://cvsbook.red-bean.com/cvsbook.ps, on Oct. 10, 2013, 218 pages.
Gadia, "A Homogeneous Relational Model and Query Languages for Temporal Databases," *ACM Transactions on Database Systems* 13(4):418-448, Dec. 1988.
Gage, "Sun's 'objective' is to populate Java networks," *Computer Reseller News*, Apr. 15, 1996, p. 69, 2 pages.
International Search Report and Written Opinion, mailed Aug. 5, 2008, for PCT/US2007/009040, 7 pages.
International Search Report and Written Opinion, mailed Jul. 18, 2008, for PCT/US2007/009041, 8 pages.
International Search Report and Written Opinion, mailed Jul. 14, 2008, for PCT/US2007/009042, 6 pages.
International Search Report and Written Opinion, mailed Jul. 18, 2008, for PCT/US2007/009043, 9 pages.
Murdock, "Office Automation System for Data Base Management and Forms Generation," U.S. Appl. No. 07/471,290, filed Jan. 26, 1990, 163 pages.
Sinyagin et al., "Integration Testing Method and System for Web Services," U.S. Appl. No. 14/104,749, filed Dec. 12, 2013, 63 pages.
Snodgrass et al., "Temporal Databases," IEEE Computer, Sep. 1986, pp. 35-42.
Snyder et al., "Apparatus, Method and Article to Provide an Insurance Workflow Management System," U.S. Appl. No. 13/598,297, filed Aug. 29, 2012, 86 pages.
Woo et al., "Meaningful interaction in web-based learning: A social constructivist interpretation," *Internet and Higher Education* 10(1):15-25, 2007.
Hegarty et al., "Ambient Intelligent Mobile Persistent Browsing Experience (AIMPBE): Seamless Session Browsing Experiences across Heterogeneous Devices using Sensors," Proceedings of the 9th Annual Post-Graduate Symposium on the Convergence of Telecommunications, Networking and Broadcasting (PGNET 2008), Liverpool, UK, Jun. 2008, 6 pages.
McDowell, "Performance Testing of Web Application Components Using Image Differentiation," U.S. Appl. No. 14/926,465, filed Oct. 29, 2015, 44 pages.
Song et al., "Browser Session Preservation and Migration," 2002, 2 pages.
Song et al., "Browser State Repository Service," *Lecture Notes in Computer Science 2414—Pervasive Computing*, pp. 253-266, 2002.
Yuan et al., "Using GUI Run-Time Sate as Feedback to Generate Test Cases," 29th International Conference on Software Engineering, IEEE 2007, 10 pages.
Cherkasov, "Method, System, and Computer-Readable Medium to Provide Version Management of Documents in a File Management System," Amendment filed May 4, 2015 for U.S. Appl. No. 11/783,912, 18 pages.
Cherkasov, "Method, System, and Computer-Readable Medium to Provide Version Management of Documents in a File Management System," Office Action mailed Jul. 9, 2015 for U.S. Appl. No. 11/783,912, 22 pages.

\* cited by examiner

```
<html xmlns="http://www.w3.org/1999/xhtml">
<head id="pageHead">
<title>Insurance Software and Agency Management Systems | Vertafore</title>
<meta http-equiv="Content-Type" content="text/html; charset=UTF-8" />
<link type="text/css" media="screen" rel="stylesheet" href="/js/colorbox/colorbox.css" />    ①
<link rel="Stylesheet" type="text/css" href="/css/homeconsolidate.css" />
              302
<style type="text/css">
 #newbanners{
    margin: 10px 0;          ②
    width: 954px;           304
    margin-left: -2px;
 }
</style>
</head>
<body>
....
<div style="float: right; background: blue; font-family: Arial"      ③
<div class="hero-learn-more"><a href="/sitecore/content/All-Products/WorkSmart">Learn More</a></div>      306
<div class="hero-video-link noshow"><a class="colorbox cboxelement">Play video</a></div>
</div>                     308
....
<script type="text/javascript">
  jQuery(".colorbox").each(function () { (this.css("color") = "#010101" }}}   ④
</script>
</body>
</html>
```

FIG. 3A

FIG. 3B div,#elem{
  color: orange;
  text-align: center;
}

FIG. 3C

`<h1 style="color::red;">...</h1>`

FIG. 4B

| Entities | Categories | | | |
|---|---|---|---|---|
| | Web background | Mobile background | Major Font | Secondary Font | Mobile Font | ... | ... | ... |
| #1H1H1h | 0.54 | 0.1 | 0.146 | 0.192 | 0.04 | .. | .. | .. |
| #DDDDD | 0.08 | 0.04 | 0.65 | 0 | 0 | .. | .. | .. |
| Arial font | 0.12 | 0.146 | 0.34 | 0.45 | 0.56 | .. | .. | .. |

AUTOMATED CUSTOMIZED WEB PORTAL TEMPLATE GENERATION SYSTEMS AND METHODS

BACKGROUND

Technical Field

The present disclosure generally relates to systems and methods for autonomously generating Web portal templates.

Description of the Related Art

Many entitles (e.g., business, individuals, groups, organizations) provide online or electronic access to information and/or services via Websites hosted via one or more Web-servers. The Websites typically comprise one, or more typically, multiple Webpages. Webpages typically include information or content, and may include one or more hyperlinks to other Webpages.

Each of the Webpages is generated using a number of data files and coded using a markup language such as HyperText Markup Language (HTML) or Extensible HyperText Markup Language (XHTML). A Web browser (e.g., Internet Explorer®, Safari®, Opera®, Firefox®) uses the contents of an HTML or XHTML file to generate visible and/or audible Web pages on a Website user's output device. The HTML or XHTML code is not ordinarily directly displayed on the Webpage, but is instead used by a Web browser operating on the recipient device to interpret or generate the content of the Webpage. HTML differs from programming language in that HTML describes the structure and content of a Web page semantically along with cues for presentation, making it a markup language.

HTML elements form the building blocks of all Websites. HTML permits embedding images and objects in the Web page and also may be used to create interactive forms. HTML provides a convenient format for creating structured documents by denoting structural semantics for text such as headings, paragraphs, lists, links, quotes and other items. Scripts such as JavaScript may be embedded on a Web page. Such scripts can affect the behavior of various aspects of an HTML Web page. HTML may additionally include formatting commands in the form of Cascading Style Sheets (CSS) that define the look and layout of text, images, and other information presented on Webpages. The Worldwide Web Consortium ("W3C"), maintainer of both the HTML and the CSS standards, encourages the use of CSS over explicit presentational HTML.

The Website for any given entity typically has an aesthetic (i.e., look and feel) and/or organization (e.g., layout) which is at least somewhat consistent across the various Webpages of the Website. This standardization of the look and feel, as well as overall organization, facilitates use by Website users, and also assists the Website users in recognizing that they are moving between Webpages within a distinct Website, rather than linking to Websites of other entities.

The aesthetic and organizational aspects or characteristics for a Website may, for example, include a color of a background, colors of headings or text, color, font style and/or font size of headings, text, as well as relative position of headings, text, and images on the Webpage. For instance, each Webpage of a given Website may share a same background color, and each may have a topmost heading which shares a same color, font style, and font size as the other Webpages of the Website. Also, for instance, each Webpage may include a same or similar organizational structure or layout, for instance, with a topmost heading along a top of each Webpage, a number of user selectable icons in a list extending vertically along a left margin of each Webpage, and entity identification information and copyright notice extending horizontally along a bottom margin of each Webpage. Of course, Websites and Webpages may employ a large variety of other aesthetic and organizational aspects or characteristics. The use of CSSs has facilitated consistency across the Webpages of a Website.

In some instances, the Website may include or implement a Web portal, for example, to provide online or electronic access to content and/or services. The Web portal may, for example, provide online or electronic access to content and/or services hosted by a dedicated system, for example, a back office or backend system. For example, the Web portal may provide access to a back office or backend system such as an accounting system, client relationship management (CRM) system, order or package tracking system, fulfillment system, etc., to name a few. The back office or backend system may be operated by or for the same entity as the entity which operates the Website or for which the Website is operated. Alternatively, the back office or backend system may be operated by or for a different entity than the entity which operates the Website or for which the Website is operated.

BRIEF SUMMARY

Data and/or services may be provided using a Web portal. However, the aesthetic and organizational aspects or characteristics of a Web portal may not match or conform to that of a given Website. This is particularly a problem where the Web portal is sourced from a third party provider (i.e., an entity that is different from the entity which operates the Website or for which the Website is operated).

Often times, Web designers responsible for a given Website ignore the inconsistencies between the Web portal and the "native" Webpages of the Website. Alternatively, the Web designers may painstakingly create or modify the aesthetic and organizational aspects or characteristics of the Web portal in an attempt to match that of the native Webpages of the Website. Such effort helps to provide a consistent Website provider identity and consumer interface, ensuring a smooth user experience, and creating a seamless integration experience for the Web user.

Described herein are systems, devices, articles and methods which employ Web portal templates, and customize the Web portal templates according to target Websites which will employ the corresponding Web portals. These may advantageously automate the creation of customized Web portal templates that provide third party supplied content and/or services with aesthetic and/or organizational aspects or characteristics consistent with other native Webpages of a Website of an entity. Such an automated Web portal template generation process improves Web user experience by providing a consistent "look and feel" across a Website, regardless of the point of origin of the data provided via the Website.

With the advent of various form factor electronic devices (e.g., desktop monitors, laptop computers, netbook computers, tablet computers, smartphones, and wearable computer and/or display devices such as Google Glass® or the Pebble® smartwatch) the problem of maintaining consistent Website appearance and functionality between devices has become more acute. Described herein are systems, devices, articles and methods which further advantageously automate customization of the Website aesthetic and organizational aspects or characteristics (e.g., suggesting changes for background colors, heading colors, text colors, font styles, font sizes) across a Website provider's Webpages to improve rendering consistency and Website usability across multiple platforms.

Although many Webpages are coded for optimal appearance on monitors associated with desktop or even laptop computers, shifts in market demographics mean Website users are increasingly using portable or mobile computing devices to access a Website provider's Website. Thus, colors, color combinations, fonts, and layouts that provide high visibility and are attractive in appearance on a desktop or laptop monitor that is typically used in conjunction with a keyboard or mouse in an indoor, indirectly lit environment may be problematic for Website users using a touchscreen device or in an outdoor setting (e.g., bright sunlight, changing light conditions). Understanding not only the platform performance parameters, (e.g., processor performance, graphical rendering capabilities, screen resolution, and color rendering capabilities), but also the environmental factors associated with how a platform will be used (e.g., used inside or outside, in direct or indirect light, in bright sun or in subdued room lighting) can assist in providing an appropriate interface to the Website user, thereby enhancing the experience of the Website user across platforms and environments.

Allowing Website providers to take control over the Web portal customization process and modify aspects such as colors, layouts, fonts, etc., of the Web portal would require each Website provider to either employ in-house coders/programmers or secure external coding/programming resources to make the necessary changes to Website coding. Most Website providers do not employ such coding or programming resources on a full time basis and therefore most lack the necessary knowledge in creating a Web portal that provides a seamless user experience on the Website user side. The systems, devices, articles, and methods described herein may autonomously generate customized Web portals that incorporate formatting similar to the Webpages of a Website provider's Website. The systems, devices, articles and methods described herein may advantageously employ a machine learning system that is trained using data obtained from other Web sites that are in some way related to or affiliated with the Website provider, for example, being from a same field of endeavor of the Website provider. For example, a positive training set of data may be generated based on sites of other entities in the same field of endeavor (e.g., Websites of other insurance industry entities where the Website provider is an insurance industry entity, such as an agency, brokerage, or carrier). Also, for example, a negative training set of data may be generated based on sites of other entities in other fields of endeavor (e.g., Websites of other industry entities where the Website provider is an insurance industry entity).

The automated Web portal template generation systems, devices, articles and methods described herein may use machine-learning techniques to extract customizations present in the Website provider's Website, and propose the customizations for acceptance. If accepted, the customizations may be used to automatically or autonomously generate a customized Web portal similar in style and design to a target Website.

The systems, devices, articles and methods described herein may allow for automatic detection of style changes in Webpages of a Website, and autonomously adapt the customized Web portal in a manner that matches such changes.

Mobile displays are not as powerful as desktop monitors, and they differ in other ways as well, as they are used in different light settings. In addition, many mobile users set the contrast and brightness settings at the extremes, to conserve energy, or to facilitate the use of mobile devices in bright ambient environments (e.g., in direct sunlight). The automated template generation systems and methods developed by the Applicants accommodate different device and display form factors by favoring dark fonts on light backgrounds and discriminating bright colors that are not rendered correctly across all platforms. For these adjustments, weights are used by calculating distances between colors to identify contrast factors.

A color wheel is a visual representation of colors arranged according to their chromatic relationship. Complementary colors are directly opposed on a color wheel. For the Red-Green-Blue color space some examples of complementary color combinations are red/cyan, green/magenta, and violet/yellow. Color also can be divided on dominant and recessive color groups. According to color theory, the dominant color is defined by its wavelength in the color spectrum. For example, wavelengths of monochromatic light that remain constant and are then combined with achromatic light are dominant. The dominant color will hold its hue despite its surroundings. On the other hand, recessive colors are the colors which blend into the background and don't have a distinctive presence. In many Web pages, recessive colors are often used for background images. The systems, devices, articles, and methods described herein may use recessive and dominant colors while counting complementary alignment and visually active or passive positions thus improving maximizing contrast and readability.

The systems, devices, articles, and methods described herein may crawl a n-level deep page tree of the URL. After crawling the page tree, the systems, devices, articles and methods may parse the coding (e.g., the HTML and CSS instructions) included in the Webpages of the Website provider's Website. The systems, devices, articles and methods described herein may identify dominant, neutral, supplemental, and recessive colors with characteristics, such as: attraction; coverage; lighting; and HTML positioning to create an entity feature set that is subsequently used for classification. After groups of colors are identified, the systems, devices, articles and methods described herein may provide a color match and adapt colors to fit a variety of Website user electronic device platforms.

The systems, devices, articles, and methods described herein may comprise three stages:

1. A preprocessing stage that trains a Classifier that identifies Webpage elements via a machine-learning system, trained using at least one positive data set and at least one negative data set;
2. A runtime stage that generates a prospective output, including a customized Web portal template based at least in part on the Classifier output used in conjunction with input gleaned from a Website provider's Webpages;
3. A feedback stage that modifies classification features of the algorithm based on user actions.

The Preprocessing Stage

This stage leverages a classification model to build a feature set and establish dependencies between entities in the Website provider's Webpages. The decision tree classifier can, for example, include a Maximum Likelihood Classifier using multi-stage decision logic. The idea is that any unknown sample can derive the probability of belonging to a class, using one or several weighted decision functions in a successive manner. The system leverages a set of preselected pages as the initial training set and uses the unique characteristics of the returning weighted probabilities for feature matching. A decision tree is represented as a root node with the number of nonterminal nodes (decision paths) and a number of terminal nodes (classifiers).

Classifier training may be provided as a sequence of four steps:

Step 1—Data extraction—The data extraction mechanism is the same for Stage 1 and Stage 2. The automated Web portal generation system crawls the destination URL (i.e., the Website provider's Webpages) and parses the HTML to identify potential areas of styling. In HyperText Markup Language ("HTML"), styles can be applied in four different ways:

A. As a Cascading Style Sheet ("CSS") external file reference;

B. As an inline CSS block;

C. As an inline CSS style on the element; and

D. As a JavaScript style modification

Step 2—Images are identified in the CSS schema and HTML—Images are then loaded and analyzed to extract the dominant color based on simple pixel comparisons. The result of the parsing is a pair {key: value} collection of the color and corresponding feature vector, an n-dimensional vector of numerical features that represent the object.

Step 3—Preparation of the training set—A number of similar endeavor entities' web sites are used to construct a training set for testing of the machine learning algorithm. In practice, the training set can be computed of any sizable subset of domain, industry or category specific or not specific websites.

Step 4—Train classifier—The decision tree building algorithm works by recursively selecting the best attribute on which to split the data and expanding the leaf nodes of the tree until the stopping criterion is met. Any statistical algorithm may be used to generate a decision tree. The Kullback-Leibler divergence principle may be used to identify relevant information from the positive and negative feature set. Decision Tree Classification generates the output as a set of binary tree-like structures (a random forest) by constructing a multitude of decision trees at training time, and then outputting the class that represents the mode of the classes output by the individual trees.

Run Time Stage

The run time stage may be provided as a sequence of three steps.

Step 1—URL analysis—A Web address (e.g., a uniform resource locator or "URL") associated with the Website provider's Website is crawled and parsed (see the first step of Stage 1). Using the data collected from the Website provider specified URL, the automated template generation systems and methods are able to create the page feature set.

Step 2—Classification—The automated template generation systems and methods identify the color schema and the probabilities of attained matches. In some instances, the results are provided in the form of a table of probabilities.

Step 3—Color matching algorithm—After classification, multiple candidates for background colors can be identified. The color pairing and matching processor identifies the best color combinations to suit both web and mobile form factors. The pairs may be ranked based on classification probabilities and returned as a collection of results. The overall goal of this step is to coordinate the form factor as seamlessly as possible. The distance between colors is calculated as the Euclidean distance in a device-independent color space.

Feedback Stage

If the Website provider changes any of the colors selected by the automated Web portal generation system, then the training data are re-collected and updated into the classifier to retrain the machine-learning portion of the automated Web portal generation system. For example, if the Website provider doesn't select the proposed colors, but selects a different (i.e., alternative or lower ranked) color scheme, that color scheme is added to the automated Web portal generation system positive training set and the initially proposed but rejected color is added to the automated Web portal generation system negative dataset to adjust classifier weights.

A method of operation in an automated Web portal generation system to generate sets of customizations of Web portal templates may be summarized as including: parsing, by at least one component of the automated Web portal generation system, a number of Webpages of a first Website (domain/URL) from which a Web portal template to be customized is to be accessed; producing an entity feature set for the first Website based on a result of the parsing; processing the entity feature set for the first Website via a classifier executed by at least one component of the automated template generation system to produce a set of data that represents, for each of a plurality of (HTML/CSS) entities, a respective probability of the entity belonging to a respective one of a plurality of classes; performing color matching on the set of data produced via the classifier to generate a number of proposed color combinations for a proposed customization of the Web portal template; and identifying one of the proposed color combinations for a proposed customization of the Web portal template.

Processing the entity feature set for the first Website via a classifier may include executing a classification algorithm that identifies a set of color schema and probabilities of attained matches. The automated template generation system may include machine-learning circuitry, and processing the entity feature set for the first Website via a classifier, executed by at least one component of the automated template generation system, may include processing the entity feature set for the first Website via a classifier executed by the machine learning circuitry. Processing the entity feature set to produce a set of data may include processing the entity feature set to produce data that represents, for each of a plurality of hypertext markup language (HTML) or cascade style sheet (CSS) entities, a respective probability of the HTML or CSS entity belonging to a respective one of the plurality of classes. Classes may include a Web background class, a mobile background class, a major font class, a second font class, and a mobile font class. Processing the entity feature set to produce a set of data may include processing the entity feature set to produce data that represents, for each of a plurality of colors, a respective probability of the color belonging to a respective one of a plurality of classes. The method may further include: crawling an n-level deep page tree of the first Website before parsing the number of Webpages of the first Website. The method may further include: identifying potential areas of styling in a number of Web pages that comprise the first Website; and extracting cascade style sheet (CSS) information from at least some of the identified potential areas of styling on which to perform the parsing. Performing color matching to produce proposed color values may include calculating a Euclidean distance between each pair of a plurality of pairs of colors. Performing color matching to produce proposed color values may include calculating a Euclidean distance between colors for each pair of a plurality of pairs of colors in a device-independent color space. Performing color matching to produce proposed color values may include calculating distances between colors to identify contrast factors using weights. Performing color matching on the set of data produced via the classifier may include performing color matching to generate a number of proposed colors for a combination of background and foreground or text entities. Performing color matching on the set of data produced via the classifier may include performing color matching to generate a number of proposed colors suitable for both mobile and non-mobile displays. Performing color matching may include identifying candidate background colors. Identifying candidate background colors may include at least one of: i) favoring dark fonts on light backgrounds; and ii) discriminating against bright colors; accounting for recessiveness and dominance of colors, accounting for a complementary alignment of colors per a color wheel representation. Identifying candidate background colors may include accounting for visually active or passive positions of the corresponding entities. Producing an entity feature set for the first Website, based on a set of results of the parsing, may include executing a statistical calculation algorithm to identify at least one of a dominant color, a neutral color, a supplemental color or a recessive color (with characteristics, e.g., attraction, coverage, lighting, html positioning). The results of parsing may include a pair collection of color and the corresponding feature vector, the feature vectors including an n-dimensional vector of numerical values for respective attributes associated with the respective color in the first Website. The method may further include: ranking pairs of color combinations based at least in part on the probabilities from the processing via the classifier; and returning the ranking as a collection of results for user evaluation. The method may further include: autonomously applying the identified one of the proposed color combinations to the Web portal template to produce an instance of a customized Web portal. The method may further include: subsequently, detecting a change in the target Website; and autonomously propagating a revision based on the detected change to the portal template to produce an instance of a revised customized Web portal.

An automated Web portal generation system that generates sets of customizations of Web portal templates may be summarized as including: at least one processor; at least one non-transitory storage media communicably coupled to at least one processor, the non-transitory storage media storing at least one of data or processor-readable instruction sets that, when executed by at least one processor, cause the at least one processor to function as an automated Web portal system that: parses a number of Webpages of a first Website (domain/URL) from which a Web portal template to be customized is to be accessed; produces an entity feature set for the first Website based on a result of the parsing; processes the entity feature set for the first Website via a classifier to produce a set of data that represents, for each of a plurality of (HTML/CSS) entities, a respective probability of the entity belonging to a respective one of a plurality of classes; performs color matching on the set of data produced via the classifier to generate a number of proposed color combinations for a proposed customization of the Web portal template; and identifies one of the proposed color combinations for a proposed customization of the Web portal template.

The processor-readable instruction sets that cause the at least one processor to process the entity feature set for the first Website via a classifier may further cause the at least one processor to: execute a classification algorithm that identifies a set of color schema and probabilities of attained matches. At least one processor may further include machine-learning circuitry; and wherein the processor-readable instruction sets that cause at least one processor to process the entity feature set for the first Website via a classifier may further cause the at least one processor to process the entity feature set for the first Website via a classifier executed by the machine-learning circuitry. The processor-readable instruction sets that cause at least one processor to process the entity feature set to produce a set of data may further cause the at least one processor to: process the entity feature set to produce data that represents, for each of a plurality of hypertext markup language (HTML) or cascade style sheet (CSS) entities a respective probability of the HTML or CSS entity belonging to a respective one of the plurality of classes. The processor-readable instruction sets that cause the at least one processor to process the entity feature set for the first Website via a classifier to produce a set of data that represents a respective probability of the entity belonging to a respective one of a plurality of classes, may further cause at least one processor to: process the entity feature set for the first Website via a classifier to produce a set of data that represents a respective probability of the entity belonging to a respective one of a plurality of classes that include a Web background class, a mobile background class, a major font class, a second font class, and a mobile font class. The processor-readable instruction sets that cause the at least one processor to process the entity feature set to produce a set of data may further cause the at least one processor to: process the entity feature set to produce data that represents, for each of a plurality of colors a respective probability of the color belonging to a respective one of a plurality of classes. The processor-readable instruction sets may further cause at least one processor to function as an automated Web portal system that: crawls an n-level deep page tree of the first Website before parsing the number of Webpages of the first Website. The processor-readable instruction sets may further cause at least one processor to function as an automated Web portal system that: identifies potential areas of styling in a number of Web pages that comprise the first Website; and extracts cascade style sheet (CSS) information from at least some of the identified potential areas of styling on which to perform the parsing. The processor-readable instruction sets that cause at least one processor to perform color matching to produce proposed color values may further cause at least one processor to: calculate a Euclidean distance between colors each pair of a plurality of pairs of colors. The processor-readable instruction sets that cause at least one processor to perform color matching to produce proposed color values may further cause at least one processor to: calculate a Euclidean distance between colors each pair of a plurality of pairs of colors in a device-independent color space. The processor-readable instruction sets that cause at least one processor to perform color matching to produce proposed color values may further cause at least one processor to: calculate distances between colors to identify contrast factors using weights. The processor-readable instruction sets that cause at least one processor to perform color matching on the set of data produced via the classifier may further cause at least one processor to: perform color matching to generate a number of proposed colors for a combination of background and foreground or text entities. The processor-readable instruction sets that cause at least one processor to perform color matching on the set of data produced via the classifier may further cause at least one processor to: perform color matching to generate a number of proposed colors suitable for both mobile and non-mobile displays. The processor-readable instruction sets that cause at least one processor to perform color matching, may further cause at least one processor to: identify candidate background colors. The processor-readable instruction sets that cause at least one processor to identify candidate background colors may further cause at least one processor to: i) favor dark fonts on light backgrounds; and ii) discriminate against bright colors; accounting for recessiveness and dominance of colors, accounting for a complementary alignment of colors per a color wheel representation. The processor-readable instruction sets that cause the at least one processor to identify candidate background colors may further cause at least one processor to: account for visually active or a passive positions of the corresponding entities. The processor-readable instruction sets that cause at least one processor to produce an entity feature set for the first Website based on a set of results of the parsing may further cause at least one processor to: execute a statistical calculation algorithm to identify at least one of a dominant color, a neutral color, a supplemental color or a recessive color (with characteristics, e.g., attraction, coverage, lighting, html positioning). The processor-executable instruction sets that cause at least one processor to produce an entity feature set for the first Website based on a result of the parsing may further cause at least one processor to: produce an entity feature set for the first Website based on a result of the parsing that includes a pair collection of color and corresponding feature vector, the feature vectors comprising an n-dimensional vector of numerical values for respective attributes associated with the respective color in the first Website. The processor-readable instruction sets may further cause at least one processor to function as an automated Web portal system that: ranks pairs of color combinations based at least in part on the probabilities from the processing via the classifier; and returns the ranking as a collection of results for user evaluation. The processor-readable instruction sets may further cause at least one processor to function as an automated Web portal system that: autonomously applies the identified one of the proposed color combinations to the Web portal template to produce an instance of a customized Web portal. The processor-readable instruction sets may further cause at least one processor to function as an automated Web portal system that: detects a subsequent change in the target Website; and autonomously propagates a revision based on the detected change to the portal template to produce an instance of a revised customized Web portal.

A method of operation in an automated Web portal generation system to generate sets of customizations of Web portal templates may be summarized as including: parsing, by at least one component of the automated Web portal generation system, a number of Webpages of a first Website from which a Web portal template to be customized is to be accessed; producing an entity feature set for the first Website based on a result of the parsing; processing the entity feature set for the first Website via a classifier executed by at least one component of the automated template generation system to produce a set of data that represents, for each of a plurality of entities, a respective probability of the entity belonging to a respective one of a plurality of classes, the classifier trained with both positive and negative training data; performing color matching on the set of data produced via the classifier to generate a number of proposed color combinations for a proposed customization of the Web portal template; receiving information indicative of at least one user selection with respect to at least one proposed color combination; and updating at least one of positive or negative training data based at least in part on the received information.

Updating at least one of positive or negative training data based at least in part on the received information may include removing a color from the positive training date set. Updating at least one of positive or negative training data based at least in part on the received information may include adding a color to the negative training data set. Updating at least one of positive or negative training data based at least in part on the received information may include both removing a color from the positive training date set and adding the color to the negative training data set. The automated template generation system may include machine-learning circuitry, and processing the entity feature set for the first Website via a classifier executed by at least one component of the automated template generation system may include processing the entity feature set for the first Website via a classifier executed by the machine learning circuitry.

An automated Web portal generation system to generate sets of customizations of Web portal templates may be summarized as including: at least one processor; at least one non-transitory storage media communicably coupled to at least one processor, the non-transitory storage media storing at least one of data or processor-readable instruction sets that, when executed by at least one processor, cause at least one processor to function as an automated Web portal system that: parses a number of Webpages of a first Website from which a Web portal template to be customized is to be accessed; produces an entity feature set for the first Website based on a result of the parsing; processes the entity feature set for the first Website via a classifier to produce a set of data that represents, for each of a plurality of entities a respective probability of the entity belonging to a respective one of a plurality of classes, the classifier trained with of both positive and negative training data; performs color matching on the set of data produced via the classifier to generate a number of proposed color combinations for a proposed customization of the Web portal template; receives information indicative of at least one user selection with respect to at least one proposed color combination; and updates at least one of positive or negative training data based at least in part on the received information.

The processor-readable instruction sets that cause at least one processor to update at least one of positive or negative training data based at least in part on the received information, may further cause at least one processor to: remove a color from the positive training data set. The processor-readable instruction sets that cause at least one processor to update at least one of positive or negative training data based at least in part on the received information, may further cause at least one processor to: add a color to the negative training data set. The processor-readable instruction sets that cause at least one processor to update at least one of positive or negative training data based at least in part on the received information, may further cause at least one processor to: remove a color from the positive training date set; and add the color to the negative training data set. The at least one processor may further include machine-learning circuitry; and wherein the processor-readable instruction sets that cause at least one processor to process the entity feature set for the first Website via a classifier executed by at least one component of the automated template generation system may further cause at least one processor to: process the entity feature set for the first Website via a classifier executed by the machine learning circuitry.

A method of operation in a training system related to automated customization of Web portal templates via machine-learning may be summarized as including: generating, via at least one processor-based component of the training system, an initial positive training data set of based on a plurality of Websites of entities in a first defined field of endeavor; generating, via at least one processor-based component of the training system, an initial negative training data set of based on a plurality of Websites of entities in the one or more fields of endeavor that are different from the first defined field of endeavor; and training, via at least one processor-based component of the training system, a classifier based on the initial positive data set and the initial negative data sets.

The method may further include: eliminating, via at least one processor-based component of the training system, at least one entity which appears in both the initial positive training data set and the initial negative training data set before training the classifier based on the initial positive data set and the initial negative data sets. The method may further include: generating a classification feature set via at least one processor-based component of the training system. The method may further include: training an algorithm based at least in part on the generated classification feature set via at least one processor-based component of the training system. Training an algorithm may include training a decision tree classifier. The method may further include: for each of the plurality of Websites of the entities in a first defined field of endeavor, crawling an n-level deep page tree of respective ones of the Websites; and parsing, by at least one component of the automated Web portal generation system, a number of Webpages of the respective Websites; and for each of the plurality of Websites of the entities in the one or more fields of endeavor that are different from the first defined field of endeavor, crawling an n-level deep page tree of the respective ones of the Websites; and parsing, by at least one component of the automated Web portal generation system, a number of Webpages of the respective Websites. The method may further include: identifying potential areas of styling in the Web pages that comprise the respective Websites; and extracting cascade style sheet (CSS) information from at least some of the identified potential areas of styling. The results of parsing may include a pair collection of color and corresponding feature vector, the feature vectors comprising an n-dimensional vector of numerical values for respective attributes associated with the respective color in the respective Websites.

An automated Web portal template customization machine-learning training system may be summarized as including: at least one processor; at least one non-transitory storage media communicably coupled to at least one processor, the non-transitory storage media storing at least one of data or processor-readable instruction sets that, when executed by at least one processor, cause at least one processor to function as an automated Web portal template customization machine-learning training system that: generates an initial positive training data set of based on a plurality of Websites of entities in a first defined field of endeavor; generates an initial negative training data set of based on a plurality of Websites of entities in the one or more fields of endeavor that are different from the first defined field of endeavor; and trains a classifier based on the initial positive data set and the initial negative data sets.

The processor-readable instruction sets may further cause at least one processor to function as an automated Web portal template customization machine-learning training system that: eliminates at least one entity which appears in both the initial positive training data set and the initial negative training data set before training the classifier based on the initial positive data set and the initial negative data sets. The processor-readable instruction sets may further cause at least one processor to function as an automated Web portal template customization machine-learning training system that: generates a classification feature set via at least one processor-based component of the training system. The processor-readable instruction sets may further cause at least one processor to function as an automated Web portal template customization machine-learning training system that: trains an algorithm based at least in part on the generated classification feature set via at least one processor-based component of the training system. The processor-readable instruction sets that cause at least one processor to train a classifier based on the initial positive data set and the initial negative data sets, may further cause at least one processor to: train a decision tree classifier based on the initial positive data set and the initial negative data sets. The processor-readable instruction sets may further cause at least one processor to function as an automated Web portal template customization machine-learning training system that: for each of the plurality of Websites of the entities in a first defined field of endeavor, crawls an n-level deep page tree of respective ones of the Websites; and parses a number of Webpages of the respective Websites; and for each of the plurality of Websites of the entities in the one or more fields of endeavor that are different from the first defined field of endeavor, crawls an n-level deep page tree of the respective ones of the Websites; and parses a number of Webpages of the respective Websites. The processor-readable instruction sets may further cause at least one processor to function as an automated Web portal template customization machine-learning training system that: identifies potential areas of styling in the Web pages that comprise the respective Websites; and extracts cascade style sheet (CSS) information from at least some of the identified potential areas of styling. The processor-readable instruction sets that cause at least one processor to parse a number of Webpages of the respective Websites may further cause at least one processor to: parse a number of Webpages of the respective Websites; and responsive to parsing the number of Webpages, generate a pair collection of color and corresponding feature vectors, the feature vectors comprising an n-dimensional vector of numerical values for respective attributes associated with the respective color in the respective Websites.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 3A is an example of typical Web page coding classified by the automated Web portal generation system, according to one illustrated embodiment.

FIG. 3B is an example of the properties and values typically specified by Web page cascade style sheet ("CSS") coding parsed and classified by the automated Web portal generation system, according to one illustrated embodiment.

FIG. 3C is an example of the properties and values typically specified by Web page HyperText Markup Language ("HTML") coding parsed and classified by the automated Web portal generation system, according to one illustrated embodiment.

FIG. 4B is a table showing an example data set generated by a classifier sub-system that is part of the customized Web portal generation system, according to one illustrated embodiment.

DETAILED DESCRIPTION

Figure 1:
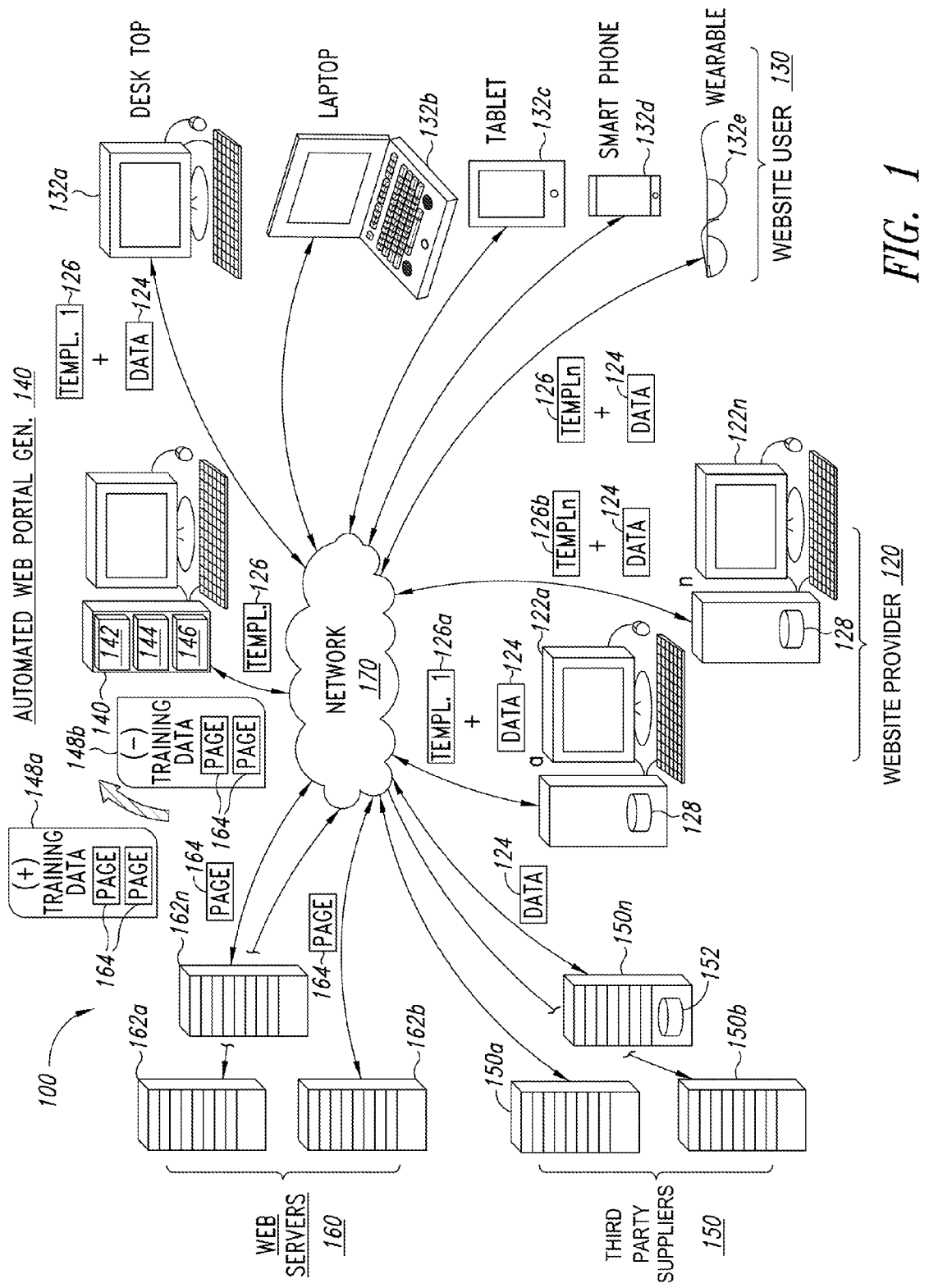
FIG. 1 is a schematic view of a networked environment according to one illustrated embodiment, the networked environment including a number of Website providers, a number of third party suppliers, a number of content hosts, an automated Web portal generation system, and a number of actual and/or potential Website users communicably coupled via one or more networks, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and/or standards associated with computer systems, server computers, HyperText Markup Language (HTML), Cascade Style Sheets (CSS), Web page coding, properties of colors, and communications networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It also should be noted that the term "or" is generally employed in its sense including "and/or" unless the content clearly dictates otherwise.

The term "Website provider" is used herein to refer to any entity capable of or actually providing content for one or more Websites available to Website users via a network such as the Internet.

The term "Website user" is used herein to refer to any entity capable of or actually accessing content provided by a Website provider.

The term "third party supplier" refers to one or more entities that provide information, for example in the form of data, to the Website provider in a template for inclusion on one or more Webpages generated by the Website provider.

The term "Hypertext Markup Language" and the corresponding HTML acronym refer to any markup language used for coding Webpages. Such markup languages can include, without limitation, Extensible Hypertext Markup Language (XHTML), Extensible Markup Language (XML), and all current and future versions of Hypertext Markup Language such as HTML5.

The headings and Abstract of the Disclosure provided herein are for convenience only and do not interpret the scope or meaning of the embodiments.

This disclosure describes various systems, methods and articles that may be useful in electronic commerce and, in particular, the generation of customized Web portal templates that are used by Website providers to supply Website users or visitors with information in a wide variety of forms and for a wide variety of purposes, for example in providing information and data related to the provision of products, goods, services, or combinations thereof to the Website user or visitor. While specific structures and acts associated with particular illustrated embodiments are disclosed, other structures and acts may be employed in other embodiments.

FIG. 1 shows a networked environment 100 that includes automated Web portal generation capabilities, according to one illustrated embodiment. The network environment 100 includes one or more Website providers 120 that interact with one or more Website users 130 via the Website user's processor-based communications device 132a-132e (collectively "Website user devices 132"). At least a portion of the interaction between the Website provider 120 and the Website users 130 is in the form of network messages (e.g., Web pages) that include data 124 provided via one or more third party providers (e.g., content hosts) 150 and provided in the form a template 126. The template 126 is autonomously generated by an automated Web portal generation system 140 and communicated to the Website provider 120. As depicted in FIG. 1, in some instances, the automated Web portal generation system 140 may include one or more network connected devices. In other instances, the automated Web portal generation system 140 may be resident on one or more Website provider processor-based devices 122a-122n (collectively "Website provider devices 122").

The automated Web portal generation system 140 provides templates 126 that are customized to a respective Website provider 120 based upon the content of some or all of the Webpages included in the Website provider's Website. The portal template 126 includes colors, styles, and layout selected to provide a useful and aesthetically pleasing experience for the Website user 130 based at least in part on the content of the Website provider's Webpage 164 and the Website user device 132 receiving the data 124. Each template 126 is autonomously created, thereby minimizing (or even eliminating) the involvement of the Website provider 120 in generating the template and permitting the Website provider 120 to approve to reject one or more aspects of the autonomously generated template 126.

The automated Web portal generation system 140 can include a parsing sub-system 142, a classifier sub-system 144, and a color matching sub-system 146. In some instances, each of the sub-systems may include one or more components such as processors, nontransitory storage media, and input/output interfaces. In other instances, each of the sub-systems may share one or more common components which may be automated Web portal generation system resources such as processors, nontransitory storage media, and input/output interfaces. Regardless of system architecture, data and information may be shared between the parsing sub-system 142, a classifier sub-system 144, and a color matching sub-system 146.

Typically, each Website provider 120 provides one or more Web pages to a Website user 130. To obtain information, for example information regarding one or more products and/or services available from a particular Website provider 120, a Website user 130 will access one or more of the Website provider's Web pages.

The automated Web portal generation system 140 generates templates 126 for each Website provider 120 via a multi-step process in which the automated Web portal generation system 140 first parses the Website provider's n-deep level Webpage tree to determine an entity feature set based on the content of the Webpages. Based on the parsing of the Website provider's Website, the automated Web portal generation system 140 produces a feature set. Using the feature set associated with a Website provider's Website, a classifier sub-system 142 coupled to the automated Web portal generation system 140 produces a data set representative of a probability that an entity included in the Website provider's Website (as reflected in the feature set associated with the respective Website) belongs to one of a plurality of entity classes. Using the data set provided by the classifier, the automated Web portal generation system 140 performs color space matching to provide a customized Web template containing a number of proposed color combinations amenable to presentation across a variety of Website user devices 132.

In some instances, the data 124 provided to Website users 130 is provided by or originates with one or more third-party suppliers or one or more Website providers 120. The data 124 may be stored in whole or in part in nontransitory storage media 152 disposed in one or more third party provider systems 150 or stored in whole or in part in nontransitory storage media 128 disposed in one or more Website provider devices 122.

The classifier sub-system 142 includes both a machine-learning training mode in which relationships in the form of algorithms within the classifier sub-system are established and properly weighted and a run-time mode in which the classifier sub-system 142 permits the automated Web portal generation system 140 to generate a data set that includes data indicative of a probability that each entity appearing on the Website provider's Website belonging to a respective one of a plurality of entity classes. For example, when in run-time mode the classifier sub-system 142 can generate an output that includes data representative of a probability that an element displayed on the Website provider's Webpage falls within a particular class of elements (e.g., a secondary header) based on attributes such as font size, text positioning, and other attributes included in the HTML coding of the respective Webpage.

In some implementations, the classifier sub-system 142 included in the automated Web portal generation system 140 includes one or more machine learning systems that are trained using one or more training data sets 148, for example at least one positive training data set and at least one negative training data set. In such implementations, the positive training data set may include data collected from Webpages 164 associated with a number of entities within the same or similar field of endeavor as the respective Website provider 130. For example, the positive training data set for the classifier sub-system 142 may include Webpages 164 associated with entities involved in the insurance industry when the Website provider 130 is an insurance agency or brokerage. In such implementations, the negative training data set may include data collected from Webpages 164 associated with a number of entities within one or more different fields of endeavor as the respective Website provider 130.

In some implementations, the classifier sub-system 142 includes in whole or in part a decision tree to determine the probability that each entity appearing on the Website provider's Website belonging to a respective one of a plurality of entity classes. In training mode, the decision tree building algorithm recursively selects the best entity attribute on which to split data and expands the leaf nodes of the decision tree until one or more stopping criteria are satisfied. The decision tree algorithm may be generated in whole or in part using one or more statistical algorithms such as, the ID3 algorithm, an information entropy based decision tree building algorithm; the C4.5 algorithm, another information entropy based decision tree building algorithm; or, C5.0 or See5, another information entropy based decision tree building algorithm. In some instances, one or more divergence testing algorithms, such as Kullback-Leibler divergence, Bregman divergence, or Jensen-Shannon divergence algorithms, may be used to identify or otherwise designate relevant information contained in a positive training data set and/or a negative training data set. In such implementations, the trained classifier sub-system 142 may employ, at least in part, a decision tree structure that includes a plurality of binary logical structures (i.e., a random forest).

A feedback mechanism that refines or enhances at least one of the positive training data set or the negative training data set based on feedback received from the Website provider 130 may be optionally used in implementations in which the classifier sub-system 142 incorporates one or more machine learning systems. For example, the automated Web portal generation system 140 may propose a template 126 having a color scheme having satisfactory color saturation and contrast autonomously selected and proposed to the Website provider 130 by the classifier sub-system 142. However, the Website provider 130 may find the selected colors aesthetically or functionally unacceptable and may reject the proposed template 126. In such instances, all or a portion of the colors or other entity attributes included in the rejected template 126 may be incorporated into the negative training data set and/or deleted from the positive training data set.

The network 170 communicably coupling the Website provider 120, the Website users 130, the automated Web portal generation system 140, third party provider 150 that provides information in the form of data 124, and the Web servers 160 that store Webpages 164 can include any number of local area networks (LANs) or wide area networks (WANs). In some instances, the network 170 includes one or more worldwide networks such as the Internet.

Figure 2:
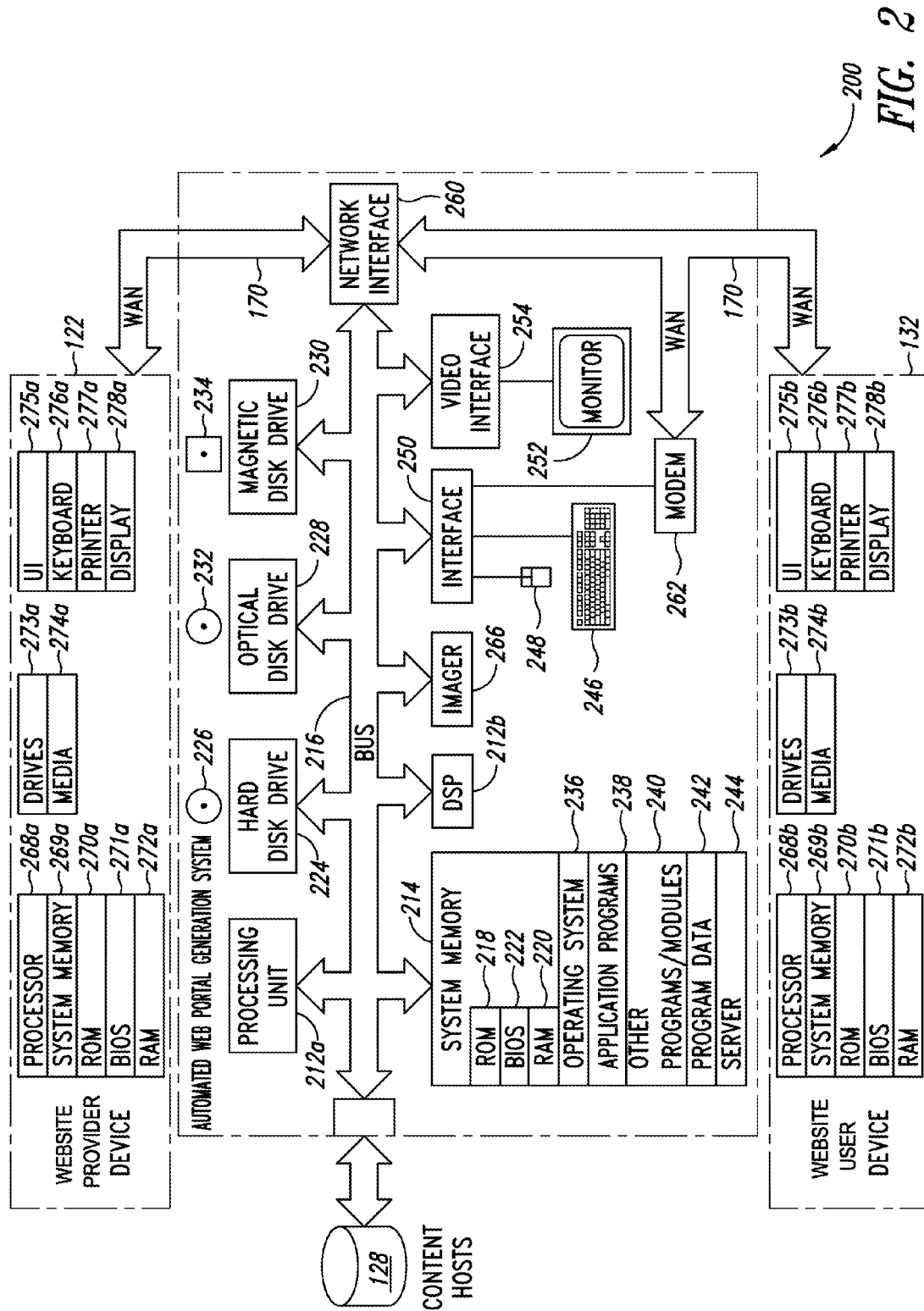
FIG. 2 is a functional block diagram of an automated Web portal generation system networked to a Website provider processor-based device and an actual or potential Website user processor-based device, according to one illustrated embodiment.

FIG. 2 and the following discussion provide a brief, general description of a networked automated Web portal generation system environment 200 in which the various illustrated embodiments can be implemented. Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices, multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 2 shows a networked automated Web portal generation system environment 200 comprising one or more automated Web portal generation systems 140 (only one illustrated) communicably coupled to one or more associated nontransitory computer- or processor readable storage medium 128 (only one illustrated). The associated nontransitory computer- or processor-readable storage medium 128 is communicatively coupled to the automated Web portal generation systems 140 via one or more tethered or wireless communications channels, for example one or more parallel cables, serial cables, or wireless channels capable of high speed communications, for instance via an IEEE 1394 FireWire®.

The networked automated Web portal generation system environment 200 also comprises one or more Website provider processor-based device(s) 122 (only one illustrated) and one or more Website user processor-based device(s) 132 (only one illustrated). The one or more Website provider processor-based device(s) 122 and the one or more Website user processor-based device(s) 132 are communicatively coupled to the automated Web portal generation system 140 by one or more communications channels, for example one or more wide area networks (WANs) 170. In some implementations, the one or more WANs may include one or more worldwide networks, for instance the Internet, that use one or more standardized communications protocols, for instance transmission control protocol/internet protocol (TCP/IP).

In operation, the one or more Website provider processor-based device(s) 122 and/or the one or more Website user processor-based device(s) 132 may function as either a server to other end user computer systems associated with a respective entity or function as end user computer systems themselves. In operation, the automated Web portal generation system 140 may functions as a server with respect to the one or more Website provider processor-based device(s) 122 and/or the one or more Website user processor-based device(s) 132.

The networked automated Web portal generation system environment 200 may employ other computer systems and network equipment, for example additional servers, proxy servers, firewalls, routers and/or bridges. The automated Web portal generation system 140 will at times be referred to in the singular herein, but this is not intended to limit the embodiments to a single device since in typical embodiments there may be more than one automated Web portal generation system 140 involved. Unless described otherwise, the construction and operation of the various blocks shown in FIG. 2 are of conventional design. As a result, such blocks need not be described in further detail herein, as they will be understood by those skilled in the relevant art.

The automated Web portal generation system(s) 140 may each include one or more processing units 212a, 212b (collectively 212), a system memory 214 and a system bus 216 that couples various system components including the system memory 214 to the processing units 212. The processing units 212 may be any logic processing unit, such as one or more logic circuits, one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the automated Web portal generation system 140, such as during start-up.

Each of the automated Web portal generation system(s) 140 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the master node server computer system 202. Although the depicted automated Web portal generation system(s) 140 is illustrated employing a hard disk 224, optical disk 228 and magnetic disk 230, those skilled in the relevant art will appreciate that other types of computer-readable media that can store data accessible by a computer may be employed, such as thumb drives, compact flash (CF) cards, memory sticks, WORM drives, RAID drives, magnetic cassettes, digital video disks ("DVD"), RAMs, ROMs, smart cards, etc.

Program modules can be stored in the system memory 214, such as an operating system 236, one or more application programs 238, other programs or modules 240 and program data 242. In some implementations, the one or more application programs 238 include one or more machine- or processor-readable instruction sets that when executed cause the at least one processor 212 to function as a parser sub-system system that parses a number of Webpages included in a Website provider's Website and produces an entity feature set that is logically associable in a nontransitory storage media with the respective Website provider Website. At times, the entity feature set includes data representative of the content and style of the Website provider's Website as determined by the parser sub-system system using the Website provider's Website HTML coding. For example, referring to FIG. 3A, a short block of illustrative Website HTML coding 300 is provided. The HTML coding 300 includes a cascade style sheet (CSS) external file reference 302, an inline CSS block 304, an inline CSS style on the element 306, and a JavaScript style modification 308. The parser sub-system system extracts the CSS data from the CSS external file reference 302, the inline CSS block 304, and the CSS style on the element 306. The information contained in the JavaScript style modification 308 is ignored.

The parser sub-system parses the CSS according to standard CSS syntax rules. Referring now to FIG. 3B, an example CSS rule 330 includes a selector 332 that points to an HTML element being styled by the CSS rule and a declaration block 334 that can include a number of declarations, each separated by a semicolon. Each declaration in the declaration block 334 includes a property 336a-336n and a respective value 338a-338n separated by a colon. In CCS rule 330, the declaration block 334 includes a first property ("color") 336a and a first value ("orange") 338a and a second property ("text-align") 336b and a second value ("center") 338b.

The parser sub-system parses HTML according to standard HTML syntax rules. Referring now to FIG. 3C, an example line of HTML code 350 includes a style attribute 354 followed by a declaration 356 that includes a property ("color") 358 followed by a value ("red") 360. An HTML tag (</h1>) closes the line of HTML code. The <h1> HTML tag indicates the style is applied to the contents of "Header 1."

The parser sub-system also extracts data indicative of the dominant colors used on the Website provider's Website. At times, such dominant color information is obtained based upon sample pixel comparisons.

The parser sub-system generates an output that includes data indicative of an entity or attribute pair that includes a "key" identifying the Webpage element and a "value" identifying one or more attributes (e.g., color, location) associated with the element. In some implementations, the output data provided by the parser sub-system may be provided in the form of one or more feature vectors. Each feature vector may be expressed as an n-dimensional vector of numerical features that represent one or more elements included in the Website provider Webpage.

In some implementations, the one or more application programs 238 include one or more machine- or processor-readable instruction sets that when executed cause the at least one processor 212 to function as a dedicated classifier sub-system 142. The classifier sub-system 142 can include a plurality of operating modes including at least a training mode and a run-time mode. In the training mode, a number of training data sets 148 are provided to the classifier sub-system 142 to create, develop, or refine one or more aspects of the classifier sub-system 142. In some instances, the one or more aspects of the classifier sub-system 142 may include the classifier sub-system's ability to recognize and identify a plurality of entity classes based on entities such as Website elements included in a Website provider's Website. In the run time mode, training data sets provided to the classifier sub-system 142 are used to create one or more predictive systems able to determine a value representative of a probability that each of at least some elements included in a Website provider's Website belong to a respective one of a plurality of entity classes.

The one or more application programs 238 include one or more machine- or processor-readable instruction sets that when executed cause the at least one processor 212 to function as a classifier training system that may be used to train the classifier sub-system 142 when the classifier sub-system 142 enters a training mode. In some implementations, the classifier training system can include providing at least one set of training data 148 to the automated Web portal generation system 140 to create, develop, or refine one or more aspects of the classifier sub-system 142. In some implementations, the a number of training data sets 148, for example a positive training data set and a negative training data set may be used to train the classifier sub-system 142.

The positive training data set may include data indicative of a plurality of Websites of entities in a first defined field of endeavor that may or may not be the same field of endeavor as the Website provider 120. In some instances, the first defined field of endeavor may be the same, allied, or related to the field of endeavor of the Website provider 120. For example, the Website data included in the one or more positive training data set may be selected from entities in the insurance industry when the Website provider 120 offers one or more insurance related products or services. The use of positive training data in the same or an allied field of endeavor provides Website coding information to the classifier sub-system 142 that reflects current industry trends or aesthetics.

The negative training data set may include data indicative of a plurality of Websites of entities in one or more different fields of endeavor from the field of endeavor of the respective Website provider 120. For example, the Website data included in the one or more negative training data sets may be selected from entities in the software industry when the Website provider 120 offers one or more insurance related products or services. The use of negative training data in different fields of endeavor provides Website coding information permits the classifier sub-system 142 to determine colors and styles that distinguish the Website provider's Webpages from other Webpages, for example Webpages provided by Website providers in one or more different fields of endeavor.

The one or more application programs 238 include one or more machine- or processor-readable instruction sets that when executed cause the at least one processor 212 to function as a run-time mode classifier sub-system 142. In the run-time mode, the classifier sub-system 142 parses a number of Webpages included in a Website provider's Website and generates a data set that includes data indicative of a probability that each of at least some entities appearing on the Website provider's Website belongs to a respective one of a plurality of entity classes. In some instances, the plurality of entity classes are determined based upon the training data sets 148 provided to the classifier sub-system 142 when the classifier sub-system is in the training mode.

The one or more application programs 238 include one or more machine- or processor-readable instruction sets that when executed cause the at least one processor 212 to function as an automated Web portal generation system 140 that parses the content of a Website provider supplied Website to provide an entity feature set that is specific to and logically associated with the Website provider supplied Website. The entity feature set is provided to the run-time classifier sub-system 142 which generates a data set that includes, for each of the entities, a probability that the entity belongs to (i.e., is a member of) a respective one of a plurality of classes. The automated Web portal generation system 140 color matches the entities included in the data set to generate a number of proposed color combinations for customization of the Website provider Web portal. The automated Web portal generation system 140 additionally identifies one of the proposed color combinations for a proposed customization of the Web portal template.

Other program modules 240 may include instructions for routine maintenance or operational features such as system security (e.g., user password or other access protection and communications encryption). The system memory 214 may also include communications programs, for example a server 244 that causes the automated Web portal generation system(s) 140 to serve electronic or digital files via corporate intranets, extranets, or other networks as described below. The server 244 in the depicted embodiment is markup language based, such as HyperText Markup Language (HTML), Extensible Markup Language (XML), Extensible HyperText Markup Language (XHTML), or Wireless Markup Language (WML), and operates with markup languages that use syntactically delimited characters added to the data of a document to represent the structure of the document. A number of suitable severs may be commercially available such as those from Mozilla, Apache, Google, Microsoft and Apple Computer.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

An operator of the automated Web portal generation system 140 can enter commands and information into the automated Web portal generation system 140 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The automated Web portal generation system 140 can, at times, include other output devices, such as speakers, printers, etc.

The automated Web portal generation system 140 operates in a networked environment using logical connections to one or more remote computers and/or devices. For example, the automated Web portal generation system 14, at times, operates in a networked environment using logical connections to one or more Website provider processor-based device(s) 122 and one or more Website user processor-based device(s) 132. Communications may be via wired and/or wireless network architecture, for instance wired and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the automated Web portal generation system 140, the one or more Website provider processor-based device(s) 122, and the one or more Website user processor-based device(s) 132.

The one or more Website provider processor-based device(s) 122 and the one or more Website user processor-based device(s) 132 typically take the form of end user processor-based devices, for instance personal computers (e.g., desktop or laptop computers), netbook computers, tablet computers, smartphones, wearable computers, and the like capable of executing one or more machine- or processor-readable instruction sets. These processor-based devices may be communicatively coupled to one or more server computers.

For example, a number of Website provider processor-based devices 122 (e.g., a number of computers in a brokerage or agency) may communicably couple to each other and to one or more local or remote servers, such as one or more third party providers 150, via a LAN or WAN and through one or more firewalls or similar structures. In such implementations, the one or more local or remote servers may execute one or more machine executable instructions sets that enable the one or more servers to provide data and other content to any number of Website provider processor-based devices 122 and/or Website user processor-based devices 132 that are locally communicably coupled via a LAN or remotely communicably coupled via one or more networks such as the Internet.

The one or more Website provider processor-based device(s) 122 and the one or more Website user processor-based device(s) 132 may include one or more processing units 268a, 268b (collectively 268), system memories 269a, 269b (collectively 269) and a system bus (not shown) that couples various system components including the system memory 269 to the processing unit 268. The one or more Website provider processor-based device(s) 122 and the one or more Website user processor-based device(s) 132 will at times each be referred to in the singular herein, but this is not intended to limit the embodiments to a single Website provider processor-based device 122 or a single Website user processor-based device 132. In typical embodiments, there may be more than one Website provider processor-based device 122 and it is highly likely that there will be more than one Website user processor-based device 132.

The processing unit 268 may be any logic processing unit, such as one or more central processing units (CPUs), digital signal processors (DSPs), application-specific integrated circuits (ASICs), field programmable gate arrays (FPGAs), etc. Non-limiting examples of commercially available computer systems include, but are not limited to, single or multi-core Celeron, i3, i5, and i7 microprocessors available from Intel Corporation, U.S.A., a single or multi-core Snapdragon microprocessor available from Qualcomm Corporation, U.S.A.; single or multi-core K5, K6, K7, K8, K10, Bobcat, or Bulldozer microprocessors available from Advanced Micro Devices, U.S.A.; single or multi-core Sparc T3, T4, and T5 microprocessors from Oracle Corporation, U.S.A.; or, a single or multi-core A$, A6, or A8 microprocessor from Apple Computer, Inc., U.S.A. Unless described otherwise, the construction and operation of the various blocks of the one or more Website provider processor-based device(s) 122 and the one or more Website user processor-based device(s) 132 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270a, 270b (collectively 270) and random access memory ("RAM") 272a, 272b (collectively 272). A basic input/output system ("BIOS") 271a, 271b (collectively 271), which can form part of the ROM 270, contains basic routines that help transfer information between elements within the one or more Website provider processor-based device(s) 122 and the one or more Website user processor-based device(s) 132 such as during device start-up, booting, or rebooting.

The one or more Website provider processor-based device(s) 122 and the one or more Website user processor-based device(s) 132 may also include one or more media drives 273a, 273b (collectively 273), e.g., a hard disk drive, magnetic disk drive, WORM drive, and/or optical disk drive, for reading from and writing to computer-readable storage media 274a, 274b (collectively 274), e.g., hard disk, optical disks, and/or magnetic disks. The computer-readable storage media 274 may, for example, take the form of removable media. For example, hard disks may take the form of a Winchester drives, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program modules and other data for the one or more Website provider processor-based device(s) 122 and the one or more Website user processor-based device(s) 132. Although described as employing computer-readable storage media 274 such as hard disks, optical disks and magnetic disks, those skilled in the relevant art will appreciate that the one or more Website provider processor-based device(s) 122 and the one or more Website user processor-based device(s) 132 may employ other types of computer-readable storage media that can store data accessible by a computer, such as magnetic cassettes, flash memory cards, digital video disks ("DVD"), RAMs, ROMs, smart cards, etc. Data or information, for example, electronic or digital documents or files or data (e.g., metadata, ownership, authorizations) related to such can be stored in the computer-readable storage media 274.

Program modules, such as an operating system, one or more application programs, other programs or modules and program data, can be stored in the system memory 269. Program modules may include instructions for accessing a Website, extranet site or other site or services (e.g., Web services) and associated Webpages, other pages, screens or services hosted by third party providers 150 and/or the automated Web portal generation system 140.

The system memory 269 may include communications programs that permit the one or more Website provider processor-based device(s) 122 and the one or more Website user processor-based device(s) 132 to retrieve electronic correspondence and/or electronic or digital documents or files from the third party providers 150. The system memory 269 may additionally include communications programs that permit the one or more Website provider processor-based device(s) 122 and the one or more Website user processor-based device(s) 132 to gain access to or retrieve electronic correspondence and/or electronic or digital documents or files from the third party providers 150, via the automated Web portal generation system 140, if the one or more Website provider processor-based device(s) 122 and the one or more Website user processor-based device(s) 132 have sufficient right, permission, privilege or authority. The system memory 269 may also include other communications programs, for example a Website user 130 may, via one or more Website providers 120, access information or data 124 provided, at least in part, by one or more third party providers 150. In some implementations, the automated Web portal generation system 140 may provide a customized Web portal template 126 to the respective Website provider 120. The customized Web portal template 126 may then be used by the respective Website provider 120 to communicate the information or data 124 to the Website user 130.

While described as being stored in the system memory 269, the operating system, application programs, other programs/modules, program data and/or browser can be stored on the computer-readable storage media 274 of the media drive(s) 273. A Website provider 120 or Website user 130 can enter commands and information into the one or more Website provider processor-based device(s) 122 and the one or more Website user processor-based device(s) 132 via a user interface 275a, 275b (collectively 275) through input devices such as a touch screen or keyboard 276a, 276b (collectively 276) and/or a pointing device 277a, 277b (collectively 277) such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278a, 278b (collectively 278) may be coupled to the system bus via a video interface, such as a video adapter. The one or more Website provider processor-based device(s) 122 and the one or more Website user processor-based device(s) 132 can include other output devices, such as speakers, printers, etc.

Figure 4A:
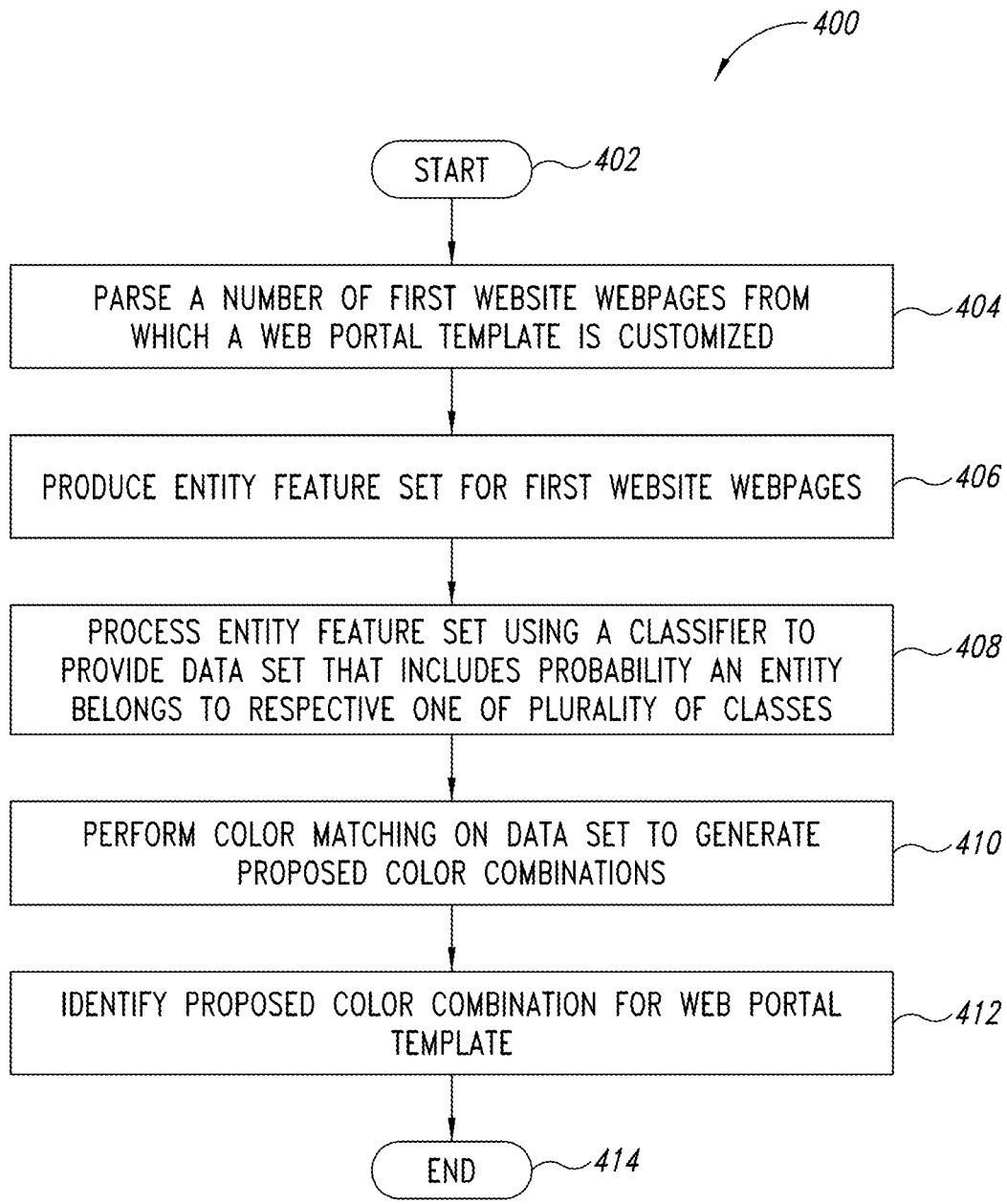
FIG. 4A is a flow diagram showing a high level method of operation of an example automated customized Web portal generation system to generate platform agnostic customized Web portal templates for a Website provider, according to one illustrated embodiment.

FIG. 4A is a flow diagram showing a high level method of operation 400 of an example automated customized Web portal generation system 140 to generate customized, platform agnostic or independent templates 126 for a Website provider 120. With the widespread use of portable or mobile computing devices by Website users 130, Website providers 120 may find it competitively advantageous to provide information and/or data 124 to a large number of diverse Website user processor-based devices 132, each having different attributes such as color rendering capabilities and display resolutions. Additionally, Website users 130 use mobile devices in a variety of ambient conditions, including low ambient light and high ambient light. Website providers 120 may find it competitively advantageous to provide information and data 124 using customized Web portal templates 126 that optimize the viewing experience for the Website user 130 (e.g., display information in a higher contrast or in colors selected for visibility in high ambient light environments).

In order to provide such customized templates 126, the automated Web portal generation system 140 first parses a Website provider's Website to identify elements in the HTML coding of the Website. Using the extracted HTML coding of the Website, the automated Web portal generation system 140 generates an entity feature set specific to the Webpages included in the Website provider's Website. The automated Web portal generation system 140 processes the entity feature set using a trained classifier sub-system 142 that generates a data set that includes, for each of the entities, a probability that the entity belongs in (i.e., can be classified as a member of) a respective one of a plurality of entity classes. The automated Web portal generation system 140 performs color matching on the data set produced by the classifier sub-system 142 and selects a proposed color combination for inclusion in the customized Web portal template 126. The method of autonomously or automatically generating a customized template 126 commences at 402.

At 404, the automated Web portal generation system 140 receives an identifier, such as a universal resource locator ("URL"), identifying a Website provider Website for which a customized Web portal template 126 will be created. Upon receiving the identifier, the automated Web portal generation system 140 parses the HTML code forming at least some of the Web pages included in the Website provider's Website.

At 406, the automated Web portal generation system 140 produces an entity feature set for the Website provider's Website. The entity feature set is produced based at least in part on the information parsed from the HTML code forming at least some of the Webpages included in the Website provider's Website. In some instances, the automated Web portal generation system 140 logically associates (i.e., forms a logical association represented as stored data) in a non-transitory machine-readable storage media 128 the data representative of the entity feature set with the respective Website provider 120.

At 408, the automated Web portal generation system 140 provides the entity feature set data to the run-time mode classifier sub-system 142. Using the entity feature set generated by the parser sub-system at 406, the classifier sub-system 142 produces a data set that includes, for each of at least some of the entity features, data representative of a probability that the respective entity feature belongs in a respective one of a plurality of entity feature classes.

For example, referring to FIG. 4B which shows an example data set 450 in the form of a table for clarity, a number of feature entities 452a-452n (collectively "feature entities 452") are shown referenced against a number of entity feature classes 454a-454n (collectively "classes 454"). A numerical probability 456$_{a,a}$-456$_{n,n}$ (collectively, "probability 456") representative of the likelihood that the respective feature entity is part of the respective class is provided at the intersection of each feature entity with each class. Thus, for example, a color given by the hex code #1H1H1h 452a has the greatest likelihood 456$_{a,a}$ of appearing in a Webpage background 454a. Similarly, a color given by color hex code #DDDDDD 452b has the greatest likelihood 456$_{c,b}$ of appearing in a major font on a Webpage 454c.

At 410, using the data set generated by the classifier sub-system 144, the color matching sub-system 146 performs color matching. In some implementations, the color matching sub-system 146 performs color matching based, at least in part, on the colors present in the Website provider's Webpages identified as background colors by the classifier sub-system 144. The color matching sub-system 146 identifies color combinations having suitable chromaticity, intensity, contrast, RGB values, or other similar color indicators, for both desktop and portable Website user processor-based devices 132. The color matching sub-system 146 ranks the pairs and returns data as a collection of proposed color combinations. In some instances, the color matching sub-system 146 ranks or otherwise classifies the proposed color combinations.

At times, the color matching sub-system 146 determines the distance between the colors in a proposed color combination as a Euclidean color distance in a device independent color space. For example, using a red/green/blue color space, the color matching sub-system 146 may determine the Euclidean distance between colors using following equation:

$$d(c1, c2) = \sqrt{(c1 \cdot \text{red} - c2 \cdot \text{red})^2 + (c1 \cdot \text{green} - c2 \cdot \text{green})^2 + (c1 \cdot \text{blue} - c2 \cdot \text{blue})^2} \quad (1)$$

At 412, the color matching sub-system 146 autonomously identifies the most likely color combination. At times, the most likely color combination may include the highest ranked color combination. In other instances, the color matching sub-system 146 user may manually select one of a number of proposed color combinations determined by the color matching sub-system 146. The selected color combination is then applied to all or a portion of the Web portal template 126. The method of autonomously or automatically generating a customized Web portal template 126 concludes or terminates at 414.

Figure 5:
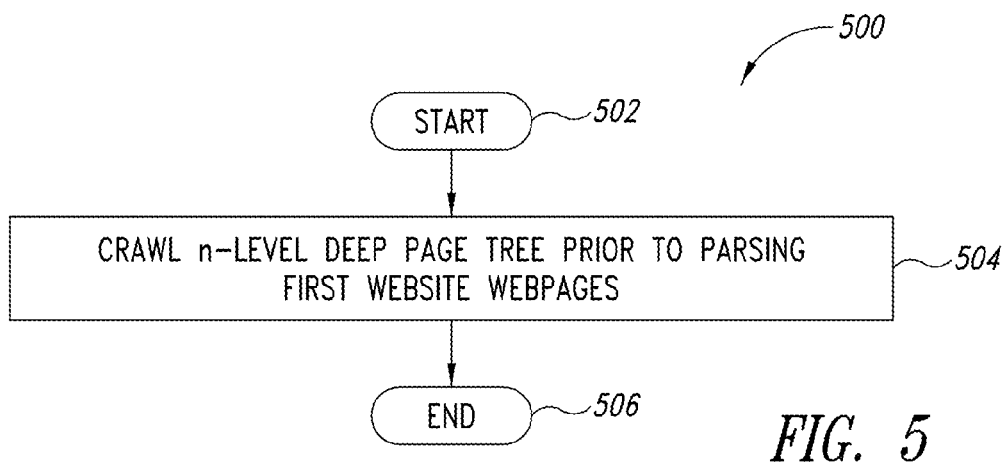
FIG. 5 is a flow diagram showing a high level method of operation of an example automated Web portal generation system to automate the generation of Web portals by crawling an n-level deep Website provider Webpage tree prior to parsing the Webpages, according to one illustrated embodiment.

FIG. 5 is a flow diagram showing a high level method of operation 500 of a parsing sub-system 142 that may be used by the automated Web portal generation system 140 to generate an entity feature set for a Website provider Website having an n-level deep Webpage tree (i.e., a full or partial graphical representation of the Webpages included in the Website provider's Website and their relationship to each other which when arranged, resemble the branching structure of a tree), according to an embodiment. At times, the Website provider Website may include information and/or data that appears on a number of Webpages. A Website user 130 may request information from the Website provider 120 that appears on a number of different pages. In such instances, the Web portal template 126 used to provide the information and/or data to the Website user 130 must extract and consolidate the requested information and/or data from the respective Webpages. In order to present information and/or data extracted from a number of Webpages, the parsing sub-system 142 may crawl at least some of the Webpages (e.g., the Webpages on which such information and/or data appears) to assess the entity features appearing on the Webpage. The method 500 of autonomously or automatically generating an entity feature set for a Website provider Website having an n-level deep Webpage tree commences at 502.

At 504, the parsing sub-system 142 determines the number of Webpages that are logically associated with the Website provider Website. In some instances, the parsing sub-system 142 parses at least a portion of the content on each of the identified n-level deep Website provider Webpages. In some instances, the parsing sub-system 142 parses at least a portion of the content on at least some of the identified n-level deep Website provider Webpages. The method 500 of autonomously or automatically generating an entity feature set for a Website provider Website having an n-level deep Webpage tree concludes at 506.

Figure 6:
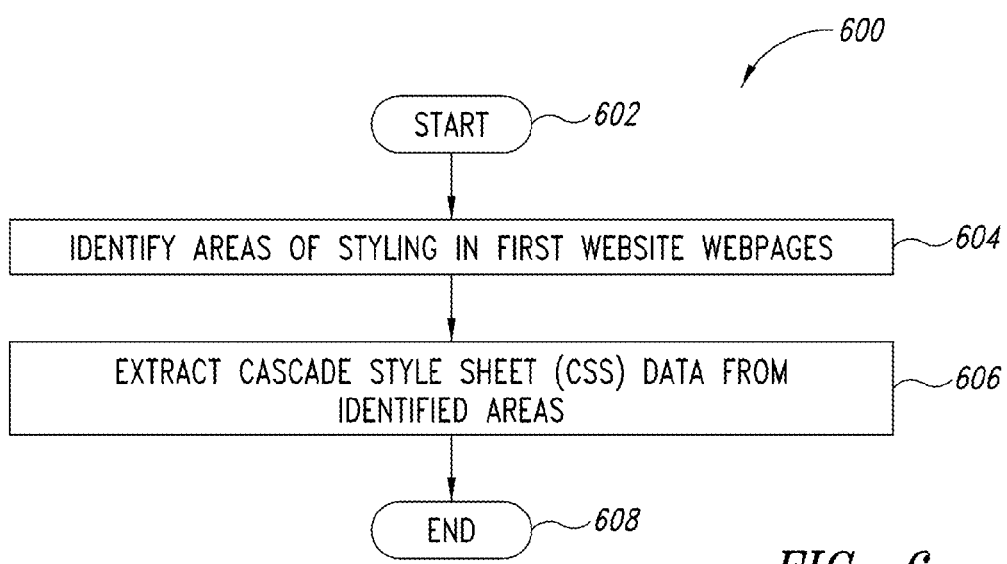
FIG. 6 is a flow diagram showing a high level method of operation of an example automated Web portal generation system to identify styling within the Web pages and extract cascade style sheet data from the identified Web pages, according to one illustrated embodiment.

FIG. 6 is a flow diagram showing a high level method of operation 600 of a parsing sub-system 142 that may be used by the automated Web portal generation system 140 to extract cascading style sheet (CSS) information from at least some of the Website provider Webpage HTML coding, according to an embodiment. At times, the Website provider Website HTML coding may include style information in the form of a cascading style sheet (CSS). A cascading style sheet is a style sheet language that describes the formatting of an XML or HTML document such as a Website provider Webpage. The method 600 of autonomously or automatically extracting cascading style sheet (CSS) information from at least some of the Website provider Webpage HTML coding commences at 602.

At 604, the parsing sub-system 142 identifies Website provider Webpage HTML coding that contains CSS coding.

At 606, the parsing sub-system 142 system extracts the CSS data from identified blocks of CSS coding. The parsing sub-system 142 parses the CSS according to standard CSS syntax rules. Referring again to FIG. 3B, an example CSS rule 330 includes a selector 332 that points to an HTML element being styled by the CSS rule and a declaration block 334 that can include a number of declarations, each separated by a semicolon. Each declaration in the declaration block 334 includes a property 336a-336n and a respective value 338a-338n separated by a colon. In CCS rule 330, the declaration block 334 includes a first property ("color") 336a and a first value ("orange") 338a and a second property ("text-align") 336b and a second value ("center") 338b. The method 600 of autonomously or automatically extracting cascading style sheet (CSS) information from at least some of the Website provider Webpage HTML coding concludes at 602.

Figure 7:
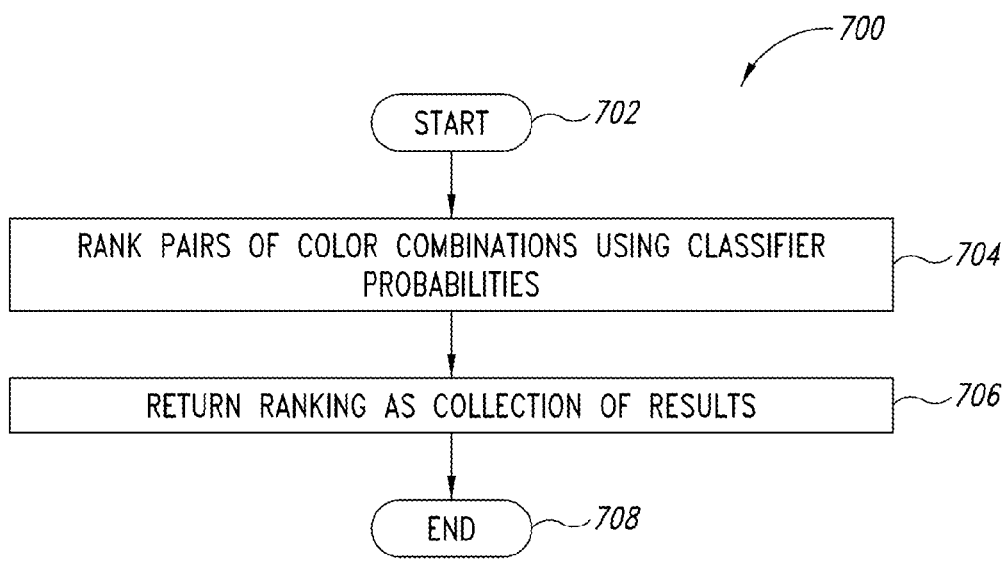
FIG. 7 is a flow diagram showing a high level method of operation of an example automated Web portal generation system to rank pairs of color combination using classifier probabilities and return the ranking as a collection of results, according to one illustrated embodiment.

FIG. 7 is a flow diagram showing a high level method of operation 700 of a color matching sub-system 146 that may be used by the automated Web portal generation system 140 to rank pairs of entity color combinations using classifier sub-system probability data and return the ranked color combinations as a collection of results, according to an embodiment. Color plays an important role in Web portal aesthetics, however certain color combinations may make it difficult, under certain ambient conditions, for Website users 130 to see the data 124 presented on the Web portal template 126. For example, a certain color combination may appear pleasing to the eye when viewed on a monitor in an indoor, indirect light situation, however when viewed in bright ambient light conditions, the same color combination may be washed out and difficult to read. The automated Web portal generation system 140 improves the readability of data 124 presented by the Web portal template 126 by selecting color combinations that are both aesthetically pleasing and visible under a variety of ambient lighting conditions when viewed on a number of different Website user processor-based devices 132. Thus, the automated Web portal generation system 140 generates a template 126 that is platform agnostic, displaying equally well on both desktop and portable Website user processor-based devices 132. The method 700 of ranking pairs of entity color combinations using classifier sub-system probability data and returning the ranked color combinations as a collection of results commences at 702.

At 704, the color matching sub-system 146 ranks color combinations provided by the classifier sub-system 144 to identify those combinations providing the best visibility on both Web and mobile Website user processor-based devices 132. The color combinations are ranked based on classification probabilities. At times, the color matching sub-system 146 evaluates the contrast between colors in some or all of the identified color combinations. For example, the contrast between colors included in a combination may be determined as a Euclidean distance in a device independent color space by taking the square root of the sum of the squares of the difference between the red, green, and blue color values of the colors included in the combination.

At 706, the color matching sub-system 146 returns the ranking determined at 704, for example to the Website provider processor-based device 122, as a collection of results. At times, the color matching sub-system 146 may return the results and request input from the Website provider processor-based device 122 prior to using the highest ranked color combinations in creating a customized Web portal template 126 for the respective Website provider 120. Such advantageously permits the Website provider 120 to select a color combination that is platform agnostic, in other words, attractive, readable, and/or aesthetically pleasing on both desktop and mobile Website user processor-based devices 132, and which is also consistent with the Website provider's other Webpages, advertising, trademarks, brick-and-mortar presence, or Web presence. The method 700 of ranking pairs of entity color combinations using classifier sub-system probability data and returning the ranked color combinations as a collection of results concludes at 708.

Figure 8:
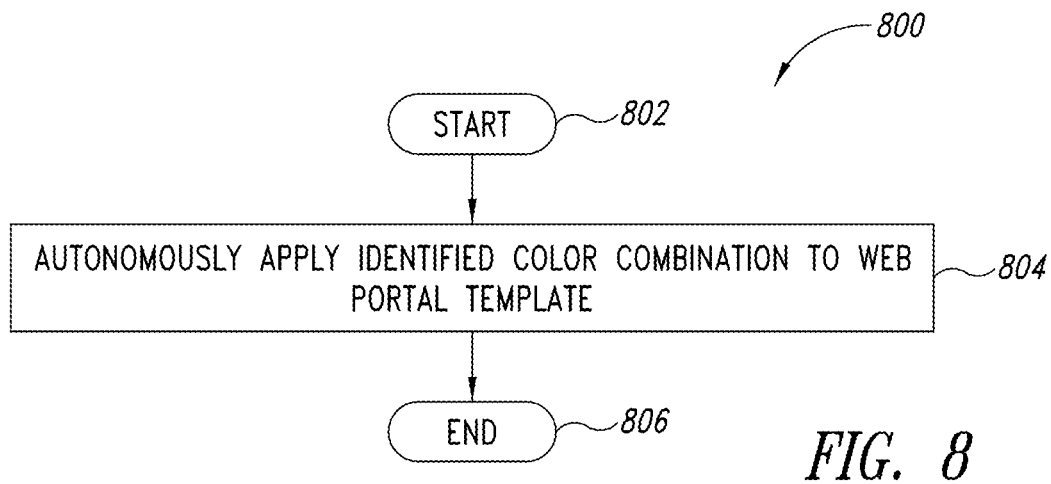
FIG. 8 is a flow diagram showing a high level method of operation of an example automated Web portal generation system to autonomously apply identified color combination(s) to the Web portal template produced by the Web portal generation system, according to one illustrated embodiment.

FIG. 8 is a flow diagram showing a high level method of operation 800 of a color matching sub-system 146 that may be used by the automated Web portal generation system 140 to autonomously apply one or more identified color combinations to the customized Web portal template 126, according to an embodiment. The method 800 of autonomously applying one or more identified color combinations to the customized Web portal template 126 commences at 802.

At 804, the color matching sub-system 146 applies the identified color combination to the customized Web portal template 126 created by the automated Web portal generation system 140 for the Website provider 120. The method 800 of autonomously applying one or more identified color combinations to the customized Web portal template 126 concludes at 806.

Figure 9:
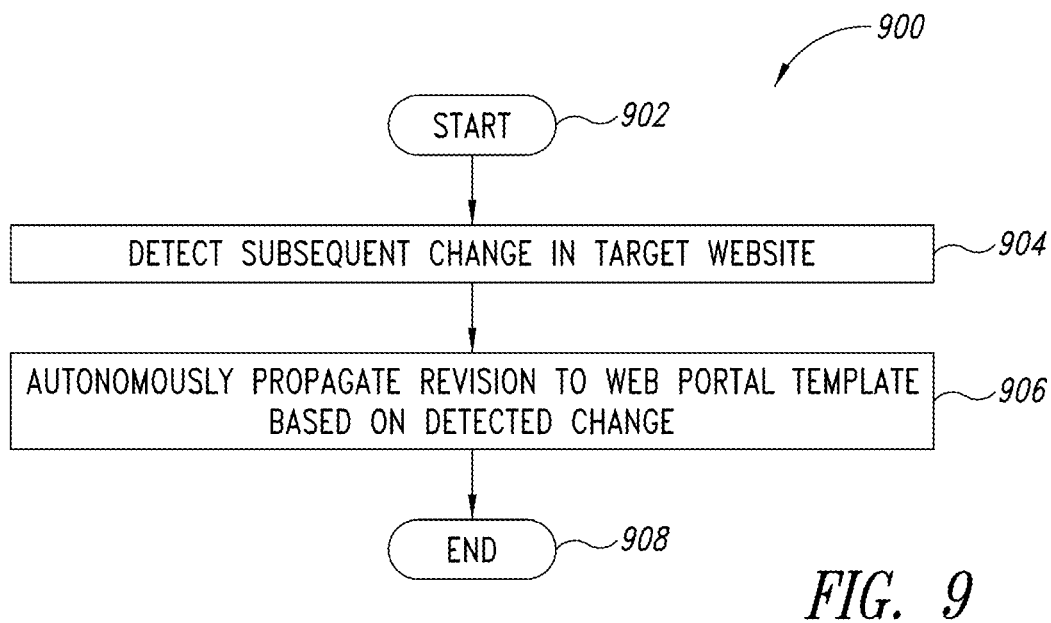
FIG. 9 is a flow diagram showing a high level method of operation of an example automated Web portal generation system to detect changes in a Website provider's Website and autonomously propagate the revision to the Web portal template for that Website provider based on the detected change, according to one illustrated embodiment.

FIG. 9 is a flow diagram showing a high level method of operation 900 of an automated Web portal generation system 140 that autonomously detects changes to a Website provider's Website and, in response to the detected changes, autonomously updates one or more customized templates 126, according to an embodiment. The method 900 of autonomously detecting changes to a Website provider's Website and, in response to the detected changes, autonomously updating one or more customized templates 126 commences at 902.

At 904, the automated Web portal generation system 140 detects a change in a Website provider's Website. Such changes may be detected by the automated Web portal generation system 140, periodically, intermittently, or occasionally polling the respective Website provider Website to detect changes to one or more Webpages. Such changes may be detected by the Website provider Website communicating one or more changes or a notification of one or more changes to the Website provider Website to the automated Web portal generation system 140.

At 906, the automated Web portal generation system 140 autonomously updates the customized Web portal templates 126 to reflect the detected changes to the Website provider's Website. At times, the automated Web portal generation system 140 may propagate the detected changes directly to the customized Web portal template 126. At times, the automated Web portal generation system 140 may perform some or all of the parsing, classification, and color matching prior to propagating the detected changes directly to the customized Web portal template 126. The method 900 of autonomously detecting changes to a Website provider's Website and, in response to the detected changes, autonomously updating one or more customized Web portal templates 126 concludes at 908.

Figure 10:
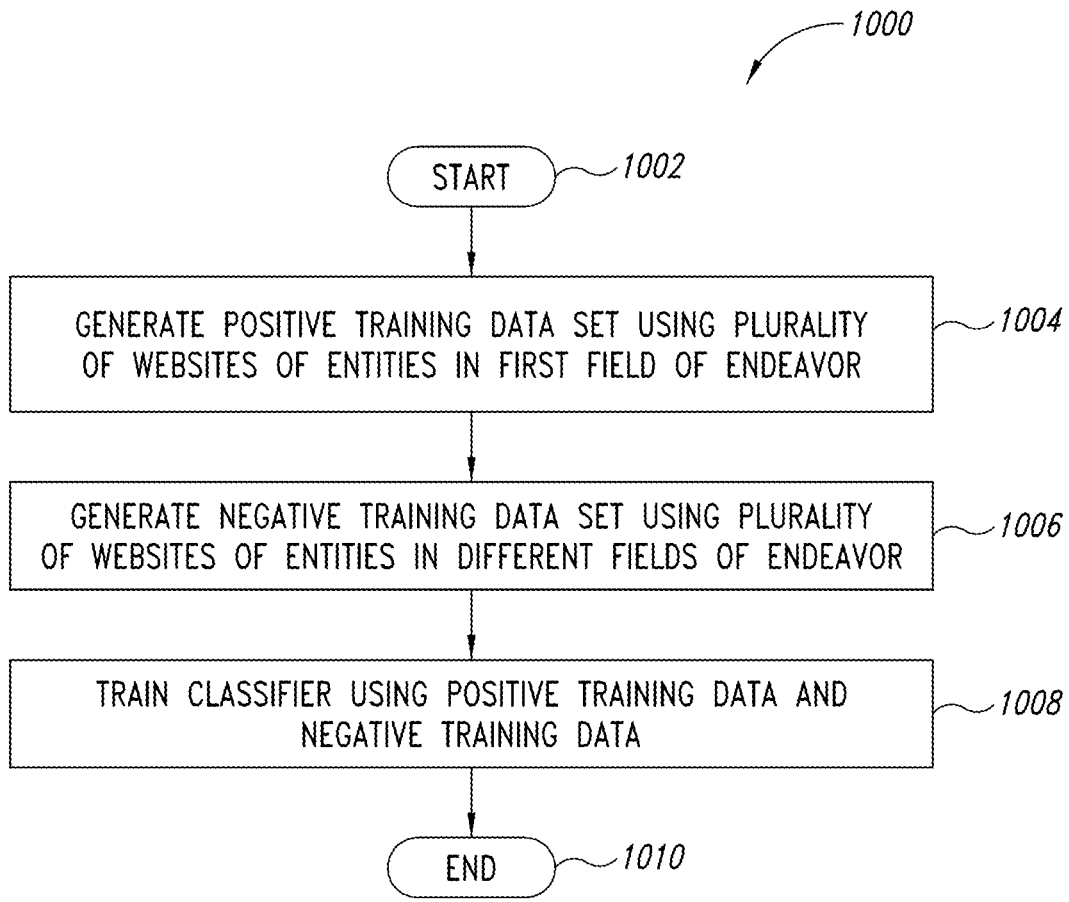
FIG. 10 is a flow diagram showing a high level method of generating a positive training set using Websites of entities in a first field of endeavor and a negative training set using Websites of entities in different fields of endeavor, the training sets to train the automated Web portal generation system, according to one illustrated embodiment.

FIG. 10 is a flow diagram showing a high level method of operation 1000 of an automated Web portal generation system 140 that generates a positive training data set 148a and a negative training data set 148b and trains the classifier sub-system 144 using either or both of the training data sets 148a, 148b, according to an embodiment. The classifier sub-system 144 relies upon effective and accurate entity feature and color identification on a variety of Web pages to accurately identify entity features and color combinations included in a Website provider's Website. At times, the classifier sub-system 144 may use machine learning techniques to develop the decision making capabilities, such as decision making algorithms, permitting the identification of entity features and color combinations on Website provider Websites. Such machine learning systems are often trained using one or more known positive training data sets and one or more known negative training data sets. The method 1000 of generating a positive training data set 148a and a negative training data set 148b and training the classifier sub-system 144 using either or both of the training data sets 148a, 148b, commences at 1002.

At 1004, the automated Web portal generation system 140 generates a positive training data set. At times, the automated Web portal generation system 140 generates the positive training data set using entity feature and color information or data obtained from a plurality of Websites selected using one or more defined criteria. In such instances, at least some of the criteria may be selected or provided by the respective Website provider 120. At other times, the automated Web portal generation system 140 generates the positive training data set using entity feature and color information or data obtained from a plurality of Websites that are known to fall within one or more defined first fields of endeavor, for example one or more defined fields of endeavor that are shared with and/or related to the field of endeavor of at least some of the Website providers 120.

At 1006, the automated Web portal generation system 140 generates a negative training data set. At times, the automated Web portal generation system 140 generates the negative training data set using entity feature and color information or data obtained from a plurality of Websites selected using one or more defined criteria. In such instances, at least some of the criteria may be selected or provided by the respective Website provider 120. At other times, the automated Web portal generation system 140 generates the negative training data set using entity feature and color information or data obtained from a plurality of Websites that are known to fall within one or more defined fields of endeavor, for example one or more defined fields of endeavor that are not shared with and/or not related to the field of endeavor of at least some of the Website providers 120.

At 1008, the automated Web portal generation system 140 trains the classifier sub-system 144 by placing the classifier sub-system 144 in training mode and providing at least a portion of at least one of a positive training data set 148a and at least a portion of at least one of a negative training data set 148b to the classifier sub-system 144. In some instances, the automated Web portal generation system 140 may provide one or more known test data sets to the trained classifier sub-system 144 to confirm the performance and/or accuracy of the classifier sub-system 144 prior to restoring the classifier sub-system 144 to run-time mode. The method 1000 of generating a positive training data set 148a and a negative training data set 148b and training the classifier sub-system 144 using either or both of the training data sets 148a, 148b, concludes at 1010.

Figure 11:
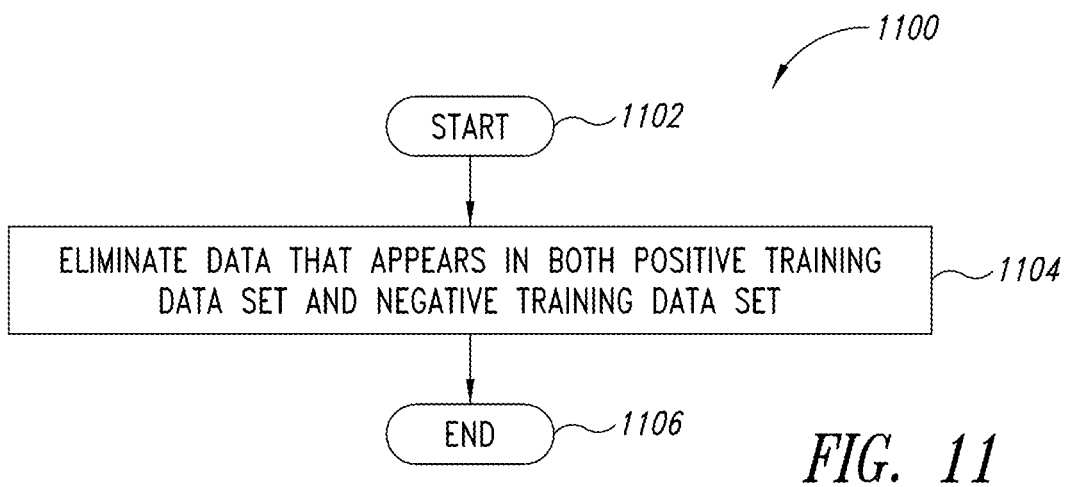
FIG. 11 is a flow diagram showing a high level method of detecting and eliminating data appearing in both a positive training data set and a negative training data set, according to one illustrated embodiment.

FIG. 11 is a flow diagram showing a high level method of operation 1100 of an automated Web portal generation system 140 that modifies either or both of a positive training data set 148a and a negative training data set 148b when identical entity feature and color information or data appears in both the positive training data set and the negative training data sets, according to an embodiment. The automated Web portal generation system 140 generates each of the positive and the negative training data sets using Websites. Although the positive training data set is composed of entity feature and color information or data obtained from a plurality of Websites within a first field of endeavor and the negative training data set is composed of entity feature and color information or data obtained from a plurality of Websites within different fields of endeavor, some data may be duplicated between the positive and the negative training data sets. Elimination of such duplicate data from both the positive training data set and the negative training data set can improve the performance and accuracy of the classifier sub-system 144. The method 1100 of modifying either or both of the positive training data set 148a and the negative training data set 148b when identical entity feature and color information or data appears in both training data sets commences at 1102.

At 1104, the automated Web portal generation system 140 eliminates, deletes, or otherwise removes duplicate entity feature and color information or data appearing in both the positive training data set 148a and the negative training data set 148b. The method 1100 of modifying either or both of the positive training data set 148a and the negative training data set 148b when identical entity feature and color information or data appears in both training data sets concludes at 1106.

Figure 12:
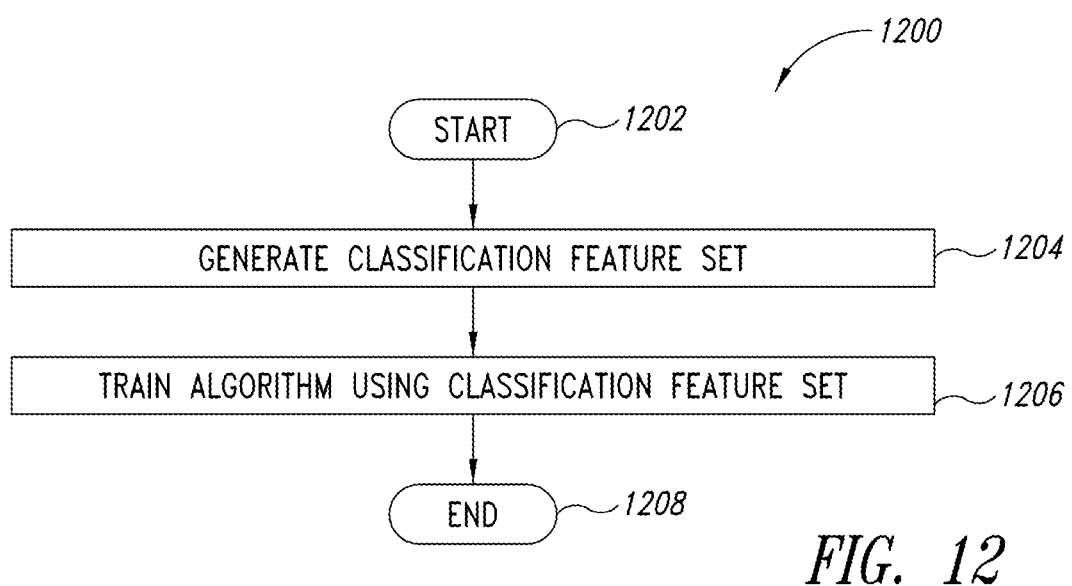
FIG. 12 is a flow diagram showing a high level method of operation of generating a classification feature set and training an automated Web portal generation system algorithm using the classification training set, according to one illustrated embodiment.

FIG. 12 is a flow diagram showing a high level method of operation 1200 of an automated Web portal generation system 140 that generates a classification entity feature set for training the classifier sub-system 144 and provides the classification entity feature set at times when the classifier sub-system 144 is placed in training mode, according to an embodiment. At times, the automated Web portal generation system 140 provides data indicative of entity feature sets found in the Websites that are in the first field of endeavor included in the positive training data set 148a and data indicative of entity feature sets found in the Websites that are in different fields of endeavor included in the negative training data set 148b to the classifier sub-system 144. The method 1200 of generating a classification entity feature set for training the classifier sub-system 144 and providing the classification entity feature set to the classifier sub-system 144 when in the training mode commences at 1202.

At 1204, the automated Web portal generation system 140 generates a classification entity feature set using at least one of a positive training data set composed of entity feature and color information or data obtained from a plurality of Websites within a first field of endeavor and/or from entity feature and color information or data obtained from a plurality of Websites within different fields of endeavor.

At 1206, the automated Web portal generation system 140 supplies the classification entity feature information or data generated at 1204 to the classifier sub-system 144 when the classifier sub-system 144 is in a training mode. The method 1200 of generating a classification entity feature set for training the classifier sub-system 144 and providing the classification entity feature set to the classifier sub-system 144 when in the training mode concludes at 1208.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification including, but not limited to: U.S. application Ser. No. 13/451,168 filed on Apr. 19, 2012 in the names of Eric William Snyder, Lloyd Sutton Hawes II and Hon Seng Long and entitled "APPARATUS, METHOD AND ARTICLE TO AUTOMATE AND MANAGE COMMUNICATIONS TO MULTIPLE ENTITIES IN A NETWORKED ENVIRONMENT"; U.S. application Ser. No. 13/451,136 filed on Apr. 19, 2012 in the names of Eric William Snyder, Steven Preston Finch, Hon Seng Long and Lloyd Sutton Hawes II and entitled "APPARATUS, METHOD AND ARTICLE TO AUTOMATE AND MANAGE ELECTRONIC DOCUMENTS IN A NETWORKED ENVIRONMENT"; and, U.S. application Ser. No. 13/451,139 filed on Apr. 19, 2012 in the names of Eric William Snyder, Lloyd Sutton Hawes II, and Hon Seng Long and entitled "APPARATUS, METHOD AND ARTICLE TO AUTOMATE AND MANAGE COMMUNICATIONS IN A NETWORKED ENVIRONMENT" are incorporated herein by reference. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operation in an automated Web portal generation system to generate sets of customizations of Web portal templates, the method comprising:

parsing, by at least one component of the automated Web portal generation system, a number of Webpages of a first Website, represented by a domain or Universal Resource Locator (URL), from which a Web portal template to be customized is to be accessed;

producing an entity feature set for the first Website based on a result of the parsing;

processing the entity feature set for the first Website via a classifier executed by at least one component of the automated Web portal generation system to produce a set of data that represents, for each of a plurality of entities, a respective probability of the entity belonging to a respective one of a plurality of classes;

performing color matching on the set of data produced via the classifier to generate a number of proposed color combinations for a proposed customization of the Web portal template, wherein performing color matching to generate a number of proposed color combinations includes identifying candidate background colors by evaluating contrast between colors of each pair of a plurality of pairs of colors in a device-independent color space;

ranking pairs of color combinations based at least in part on the probabilities from the processing via the classifier;

returning the ranking as a collection of results for user evaluation; and identifying one of the proposed color combinations for a proposed customization of the Web portal template.

2. The method of claim 1 wherein processing the entity feature set for the first Website via a classifier includes executing a classification algorithm that identifies a set of color schema and probabilities of attained color matches.

3. The method of claim 1 wherein the automated Web portal generation system includes machine-learning circuitry, and processing the entity feature set for the first Website via a classifier executed by at least one component of the automated Web portal generation system includes processing the entity feature set for the first Website via the classifier executed by the machine-learning circuitry.

4. The method of claim 3 wherein processing the entity feature set to produce a set of data includes processing the entity feature set to produce data that represents, for each of a plurality of hypertext markup language (HTML) or cascade style sheet (CSS) entities a respective probability of the HTML or CSS entity belonging to a respective one of the plurality of classes.

5. The method of claim 4 wherein classes include a Web background class, a mobile background class, a major font class, a second font class, and a mobile font class.

6. The method of claim 4 wherein processing the entity feature set to produce a set of data includes processing the entity feature set to produce data that represents, for each of a plurality of colors a respective probability of the color belonging to a respective one of the plurality of classes.

7. The method of claim 1, further comprising:
crawling an n-level deep page tree of the first Website before parsing the number of Webpages of the first Website.

8. The method of claim 6, further comprising:
identifying potential areas of styling in the number of Webpages that comprise the first Website; and
extracting cascade style sheet (CSS) information from at least some of the identified potential areas of styling on which to perform the parsing.

9. The method of claim 1 wherein performing color matching to generate a number of proposed color combinations includes calculating a Euclidean distance between colors for each pair of the plurality of pairs of colors.

10. The method of claim 1 wherein performing color matching to generate a number of proposed color combinations includes calculating a Euclidean distance between colors for each pair of the plurality of pairs of colors in a device-independent color space.

11. The method of claim 1 wherein performing color matching to generate a number of proposed color combinations includes calculating distances between colors to identify contrast factors using weights.

12. The method of claim 1 wherein performing color matching on the set of data produced via the classifier includes performing color matching to generate a number of proposed colors suitable for both mobile and non-mobile displays.

13. The method of claim 1 wherein identifying candidate background colors includes at least one of:
i) favoring dark fonts on light backgrounds; and
ii) discriminating against bright colors accounting for recessiveness and dominance of colors, accounting for a complimentary alignment of colors per a color wheel representation.

14. The method of claim 1 wherein identifying candidate background colors includes accounting for visually active or passive positions of the corresponding entities.

15. The method of claim 1 wherein producing an entity feature set for the first Website based on the results of the parsing includes executing a statistical calculation algorithm to identify at least one of a dominant color, a neutral color, a supplemental color or a recessive color with characteristics, the characteristics including at least one of attraction, coverage, lighting, or html positioning.

16. The method of claim 1, further comprising:
autonomously applying the identified one of the proposed color combinations to the Web portal template to produce an instance of a customized Web portal.

17. The method of claim 16, further comprising:
subsequently, detecting a change in the first Website; and
autonomously propagating a revision based on the detected change to the Web portal template to produce an instance of a revised customized Web portal.

18. An automated Web portal generation system that generates sets of customizations of Web portal templates, the system comprising:
at least one processor;
at least one non-transitory storage media communicably coupled to the at least one processor, the non-transitory storage media storing at least one of data or processor-readable instruction sets that, when executed by the at least one processor, cause the at least one processor to function as an automated Web portal system that:
parses a number of Webpages of a first Website), represented by a domain or Universal Resource Locator (URL), from which a Web portal template to be customized is to be accessed;
produces an entity feature set for the first Website based on a result of the parsing;
processes the entity feature set for the first Website via a classifier to produce a set of data that represents, for each of a plurality of hypertext markup language (HTML) or cascade style sheet (CSS) entities, a respective probability of the entity belonging to a respective one of a plurality of classes;
performs color matching on the set of data produced via the classifier to generate a number of proposed color combinations for a proposed customization of the Web portal template, wherein the performance of color matching to generate a number of proposed color combinations includes identification of candidate background colors by evaluation of contrast between colors of each pair of a plurality of pairs of colors in a device-independent color space;
ranks pairs of color combinations based at least in part on the probabilities from the processing via the classifier;
returns the ranking as a collection of results for user evaluation; and
identifies one of the proposed color combinations for a proposed customization of the Web portal template.

19. The automated Web portal generation system of claim 18 wherein the processor-readable instruction sets that cause the at least one processor to process the entity feature set for the first Website via a classifier further cause the at least one processor to:
execute a classification algorithm that identifies a set of color schema and probabilities of attained color matches.

20. The automated Web portal generation system of claim 18 wherein the at least one processor further comprises machine-learning circuitry; and
wherein the processor-readable instruction sets that cause the at least one processor to process the entity feature set for the first Website via a classifier further cause the at least one processor to process the entity feature set for the first Website via the classifier executed by the machine-learning circuitry.

* * * * *